United States Patent [19]

Heptig et al.

[11] Patent Number: 5,377,269
[45] Date of Patent: Dec. 27, 1994

[54] SECURITY ACCESS AND MONITORING SYSTEM FOR PERSONAL COMPUTER

[75] Inventors: John P. Heptig, Fort Worth; Robert Baker, Dallas; George R. Schultz, Coppell, all of Tex.

[73] Assignee: Intelligent Security Systems, Inc., Addison, Tex.

[21] Appl. No.: 968,534

[22] Filed: Oct. 29, 1992

[51] Int. Cl.⁵ .................. H04L 9/32; G06F 13/00
[52] U.S. Cl. .................................... 380/25; 380/4;
        380/23; 380/49; 340/825.31; 340/825.34;
        235/380
[58] Field of Search .............. 380/4, 23, 25, 49, 50;
        235/380; 340/825.31, 825.34

[56] References Cited

U.S. PATENT DOCUMENTS

| | | | |
|---|---|---|---|
| 3,609,697 | 9/1971 | Blevins et al. | 380/4 X |
| 4,599,489 | 7/1986 | Cargile | 380/4 |
| 4,609,777 | 9/1986 | Cargile | 380/4 |
| 4,757,533 | 7/1988 | Allen et al. | 380/25 |
| 4,819,267 | 4/1989 | Cargile et al. | 380/23 |
| 4,870,401 | 9/1989 | Lee et al. | 340/825.31 |
| 4,943,804 | 7/1990 | Lee et al. | 340/825.31 |
| 4,951,249 | 8/1990 | McClung et al. | 380/4 |
| 4,959,861 | 9/1990 | Howlette | 380/4 |
| 4,972,470 | 11/1990 | Farago | 380/3 |
| 5,010,331 | 4/1991 | Dias et al. | 340/825.31 |
| 5,081,676 | 1/1992 | Chou et al. | 380/4 |
| 5,083,309 | 1/1992 | Beysson | 380/4 |
| 5,155,680 | 10/1992 | Wiedemer | 364/406 |
| 5,182,770 | 1/1993 | Medveczky et al. | 380/4 |
| 5,222,133 | 6/1993 | Chou et al. | 380/4 |
| 5,222,134 | 6/1993 | Waite et al. | 380/4 |

OTHER PUBLICATIONS

Dallas Semiconductor, Electronic Key, DS1204U, promotional literature, no date.

*Primary Examiner*—Bernarr E. Gregory
*Attorney, Agent, or Firm*—David L. McCombs

[57] ABSTRACT

A system for controlling access to a computer. Memory-resident software logic cooperates with a remote electronic key device coupled to the computer's processor, through the printer port, to disable the computer unless an authorized key is inserted in the key device. The logic is executed in the processor responsive to the computer's system timer interrupt for continuous monitoring capability. Until a user inserts an authorized key, or upon removal of the key, the logic suspends operation of any application programs, the monitor is blanked and the mouse, keyboard and floppy disk drive are disabled. A record is stored in memory of authorized users and user audit information. Utility menu options are used to add or delete user keys, display access and usage records and to customize the number and selection of I/O devices to be disabled by the system.

40 Claims, 16 Drawing Sheets

STATE DIAGRAM

FIG. 7a

```
188 |--------------------------------------------------|  700
189 |               PAL/GAL Signals                    |
190 |--------------------------------------------------|
191 |                                                  |
192 |         +------xxx------+                        |
193 |    CLK  | 1    XXX   20 | VCC                    |
194 |  --MOTENB| 2          19 | -WINACT               |  /-710
195 | -MTRONDLY| 3          18 | -WINOUT               |
196 |   -WINDOW| 4          17 | -DRIVE                |
197 |    -SELA | 5          16 | -COUNT [2]            |
198 |      gnd | 6          15 | -COUNT [1]            |
199 |      gnd | 7          14 | -COUNT [0]            |
200 |      gnd | 8          13 | -RDENABLE             |
201 | -RDDATAI | 9          12 | -RDDATAO              |
202 |      GND | 10         11 | GND                   |
203 |         +---------------+                        |
204 |                                                  |
205 |--------------------------------------------------|
206 | GAL16V8       1:CLK,              | Inputs
207 |      /        2:MOTENB,
208 |    712        3:MTRONDLY,
209 |               4:WINDOW,
210 |               5:SELA,
211 |               9:RDDATAI,
212 |                                                     714
213 |              12:RDDATAO,          | Outputs
214 |              13:RDENABLE,
215 |           14..16:COUNT [0..2],
216 |              18:WINOUT,
217 |              19:WINACT
218 |
219 | high:   CLK            | System clock
220 | low:    MOTENB         | Motor on signal
221 | low:    MTRONDLY       | Motor on signal (DELAYED)
222 | high:   WINDOW         | Active window enable
223 | low:    SELA           | DriveA select input
224 | low:    RDDATAI        | Read data input
225 |                                                     716
226 | low:    COUNT [2..0]   | Pulse counter
227 | high:   RDDATAO        | Read data output pass-thru OC
228 | low:    DRIVE          | Output drive signal
229 | low:    RDENABLE       | Read enable signal
230 | high:   WINOUT         | Window output to RC & WINDOW
231 | low:    WINACT         | Window active - latched value
232 |
233 | title:  'ISS FSM Control Logic V01.02 27-Jun-92 22:00 CST'
```

FIG. 7b

```
234 !------------------------------------------------------------------718_!
235 !                                                                      !
236 !                                                                      !
237 ! Define the FSM state procedure                                       !
238 !                                                                      !
239 !                                                                      !
240 !----------------------------------------------------------------------!
241 !                                                                      !
242 ! Generate the binary state counter                                    !
243 !                                                                      !
244 !----------------------------------------------------------------------!
245 ! Condition the counter on the clock which is taken from MOTENB.       !
246 ! Reset the count on power-up.                                         !
247 ! Increment the counter on each rising clock edge within WINDOW.       !
248 ! Ignore the clock if the WINDOW is not currently active.              !
249 !----------------------------------------------------------------------!
250 ! COUNT [2..0] = CLK
251 !
252 !          ((WINDOW & (COUNT[2..0]!=7) & (COUNT[2..0]+1))#  ! Increment counter
253 !           (WINDOW & (COUNT[2..0]==7) & (COUNT[2..0]  )))  ! Ignore   clock
254 !----------------------------------------------------------------------!
255 !                                                                      !
256 ! Generate the WINDOW output signal                                    !
257 !                                                                      !
258 !----------------------------------------------------------------------!
259 ! Condition the WINOUT signal based on the MOTENB signal.              !
260 ! Note that the WINOUT signal must be fed back to the WINDOW           !
261 ! signal as follows:                                                   !
262 !                                                                      !
263 !              WINOUT >--+---------+--> WINDOW                         !
264 !                        |         |                                   !
265 !                        R         C                                   !
266 !                        R         C                                   !
267 !             R = 1MEG   R         C  0.1uF = C                        !
268 !                        R         C                                   !
269 !                        R         C                                   !
270 !                        |         |                                   !
271 !              VSS ------+---------+--- VSS                            !
272 !                                                                      !
273 ! From this we get exp(-t/RC) = 1/2 for the trip condition, or         !
274 ! t = - (R)(C) ln(0.5) = (R)(C)(0.693).                                !
275 ! For this set of values we have t = 69ms for a VCC/2 trip point.      !
276 !----------------------------------------------------------------------!
277 ! Generate a short pulse on the falling edge of MOTENB                 !
278 !----------------------------------------------------------------------!
279 ! WINACT    = MOTENB & !MTRONDLY & !WINDOW  ! Sample MOTENB falling edge
280 !----------------------------------------------------------------------!
281 ! Enable the WINDOW one-shot only if it isn't currently triggered      !
282 !----------------------------------------------------------------------!
283 ! WINOUT    !WINDOW ?? (2) ! Generate WINDOW
284
```

FIG. 7c

```
285  !---------------------------------------------------------------!
286  !                                                               !
287  !   Intercept the floppy READ DATA signal based on clock count  !
288  !                                                               !
289  !---------------------------------------------------------------!
290  !   Generate the registered ENABLE signal for the pass-thru.    !
291  !---------------------------------------------------------------!
292  !      RDENABLE        =                                        !  718
293  !                                                               !
294  !      CLK //                                                   !
295  !      (((RDENABLE &  !WINDOW)                                  !
296  !      # (RDENABLE &   WINDOW & ((COUNT[2..0])=00) & (COUNT[2..0]< 3)))  !
297  !      # (              WINDOW & ((COUNT[2..0])=3) & (COUNT[2..0]< 6))) )  !
298  !      & (             !(WINDOW &  (COUNT[2..0])=6) & (COUNT[2..0]<=7))) )  !
299  !---------------------------------------------------------------!
300  !   Take output value and simulate open collector output.       !
301  !---------------------------------------------------------------!
302  !      RDDATAO        =         (RDENABLE)       ?? RDDATAI     !
303  !      DRIVE          =         (DRIVE)          ?? (0)         !
304  !---------------------------------------------------------------!
305  !   End of GAL/PAL definition                                   !
306  !                                                               !
307  !---------------------------------------------------------------!
1289   Registered GAL architecture selected.
```

FIG. 8

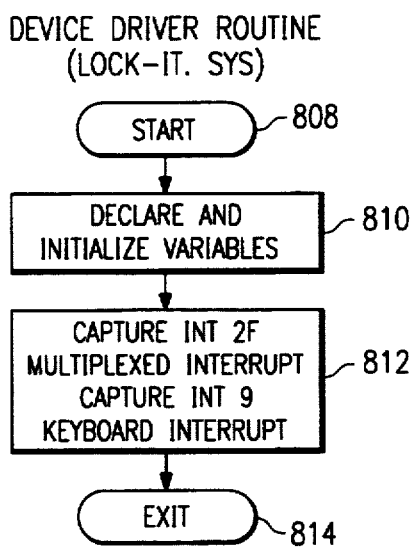

DEVICE DRIVER ROUTINE
(LOCK-IT. SYS)

START — 808
↓
DECLARE AND INITIALIZE VARIABLES — 810
↓
CAPTURE INT 2F MULTIPLEXED INTERRUPT
CAPTURE INT 9 KEYBOARD INTERRUPT — 812
↓
EXIT — 814

FIG. 7d

```
OrCAD PLD
Type:    GAL16V8
Title:   ISS FSM Control Logic
*
QP20* QF2194* QV1024*
F0*
L0000 11 11 11 11 11 11 11 11 11 11 11 11 11 11 11 11 *
L0032 10 11 01 11 10 11 11 11 11 11 11 11 11 11 11 11 *
L0256 11 10 11 11 11 11 11 11 11 11 11 11 11 11 11 11 *
L0288 11 11 11 11 11 11 11 11 11 11 11 11 11 11 11 11 *
L0512 11 11 11 11 11 11 11 11 11 11 11 11 11 11 11 11 *
L0544 11 11 11 11 11 10 11 11 11 11 11 11 01 11 11 *
L0576 11 11 11 11 11 11 11 11 11 11 11 11 10 10 11 *
L0768 11 11 11 11 01 11 11 11 11 10 11 10 11 11 11 11 *
L0800 11 11 11 11 01 11 11 10 11 11 11 11 11 11 11 11 *
L1024 11 11 11 11 01 11 11 11 11 10 11 01 11 11 11 11 *
L1056 11 11 11 11 01 11 11 11 11 01 11 11 11 11 11 11 *
L1088 11 11 11 11 01 11 11 10 11 11 11 10 11 11 11 11 *
L1280 11 11 11 11 01 11 11 10 11 10 11 11 11 11 11 11 *
L1312 11 11 11 11 01 11 11 11 11 11 11 01 11 11 11 11 *
L1536 11 11 11 11 01 11 11 01 11 10 11 10 11 11 11 11 *
L1568 11 11 11 11 01 11 11 10 11 01 11 11 11 11 11 11 *
L1600 11 11 11 11 10 11 11 11 11 11 11 11 10 11 11 *
L1632 11 11 11 11 11 11 11 01 11 11 11 11 10 11 11 *
L1792 11 11 11 11 11 10 11 11 11 11 11 11 11 11 11 *
L2048 01 00 00 01 11 11 11 11 11 11 11 11 11 11 11 *
L2080 11 11 11 11 11 11 11 11 11 11 11 11 11 11 11 11 *
L2112 11 11 11 11 11 10 00 01 11 11 11 11 11 11 11 11 *
L2144 11 11 11 11 11 11 11 11 11 11 11 11 11 11 11 11 *
L2176 11 11 11 11 11 11 11 11 01 *
C56FC*
```

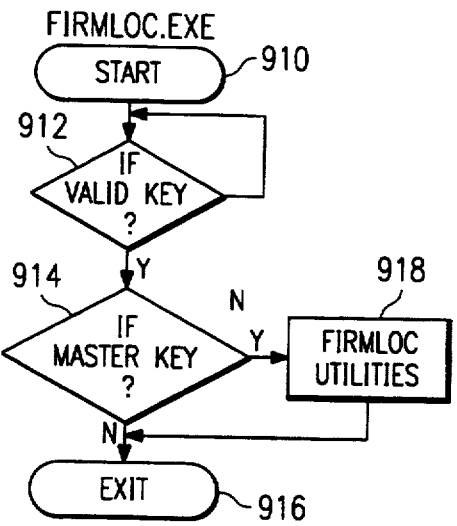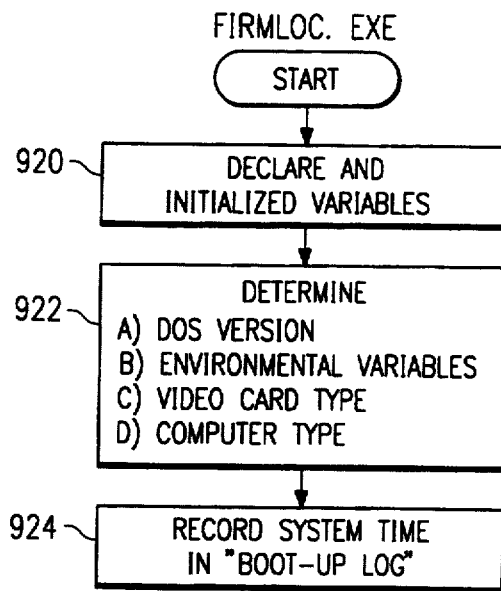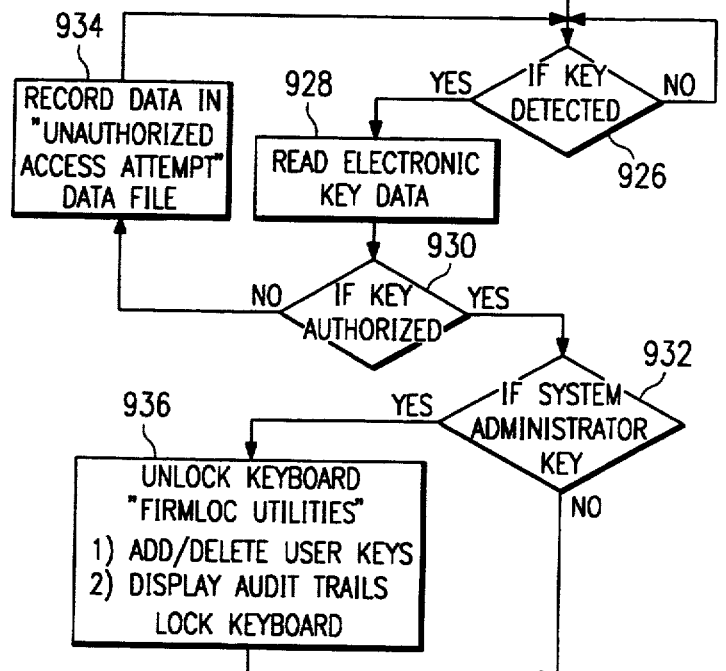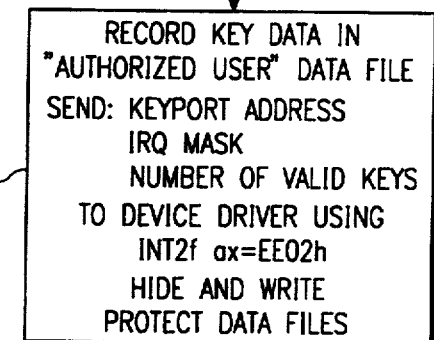
FIG. 9a
FIG. 9b

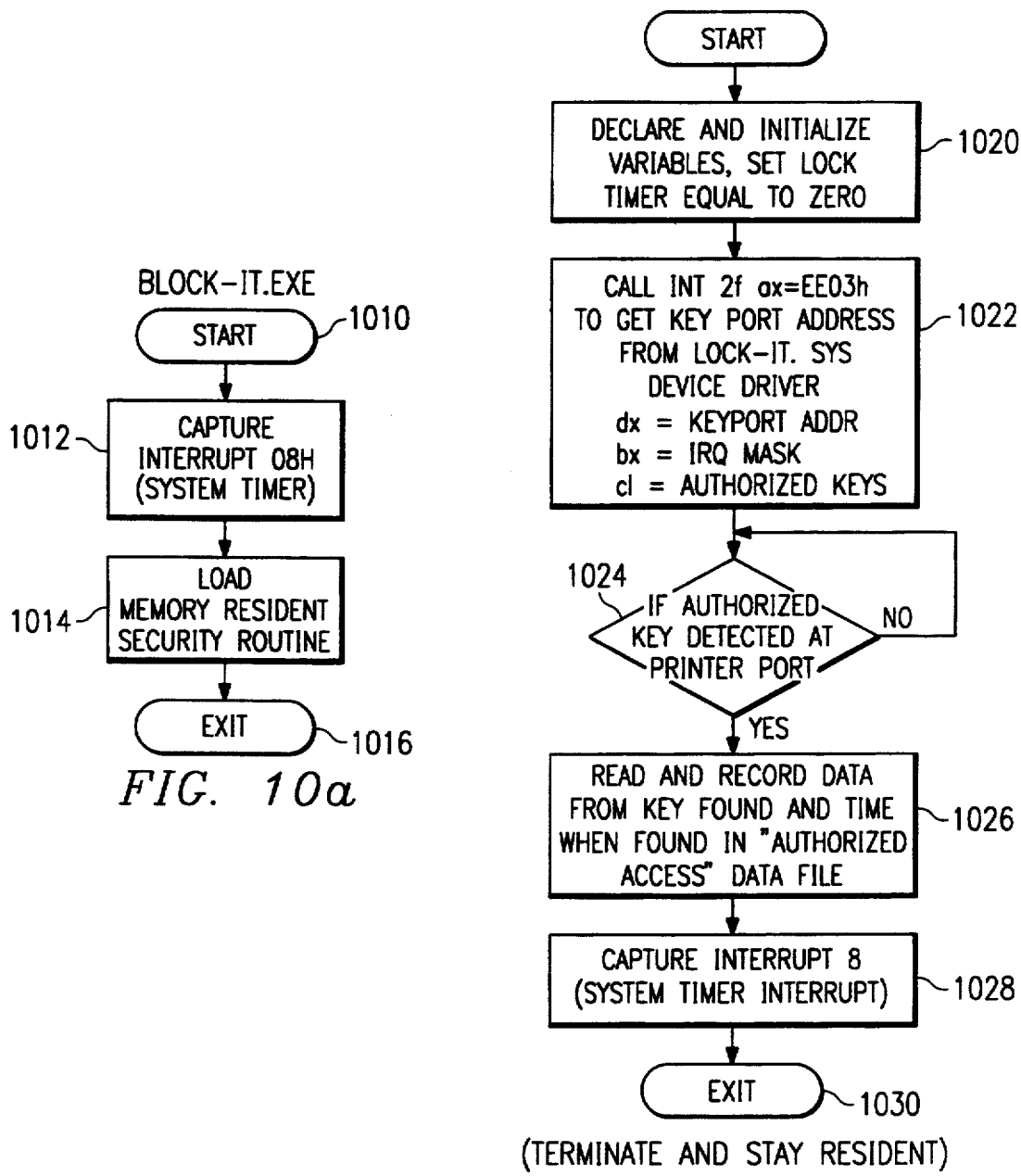

User Access Denied Datalog Window

| User name | Attempt Date | Attempt Time | Key Serial # |
|---|---|---|---|
| Bonanos | 09/16/92 | 17:53:33 | 0227 |
| buptest2 | 09/16/92 | 17:54:19 | 027 |
| Jacobson | 09/16/92 | 17:54:25 | 021D |
| GRIDLOC KEY | 09/16/92 | 17:54:45 | 043 |
| GRIDLOC KEY | 09/16/92 | 17:54:59 | 043 |
| Disgruntled | 09/16/92 | 17:55:12 | 01D |
| backup key | 09/16/92 | 17:55:18 | 0213 |
| Pat Heptig | 09/16/92 | 17:55:23 | 021E |
| Bonanos | 09/16/92 | 17:55:52 | 0227 |
| FIRMLOC KEY | 09/16/92 | 17:55:56 | 0222 |
| Roach | 09/16/92 | 17:56:01 | 019 |
| John | 09/16/92 | 17:56:07 | 0224 |
| test key12 | 09/16/92 | 17:56:21 | 02F |
| JPH key #2 | 09/16/92 | 17:56:29 | 02 | press page keys to continue

FIG. 13e

FIRMLOC Setup Options Menu

1330 — User Display Options

1332 — Hardware IRQ Options

Return To FIRMLOC Main Utility Menu

1306 use arrow keys and press enter

FIG. 13f

SECURITY ACCESS AND MONITORING SYSTEM FOR PERSONAL COMPUTER

FIELD OF THE INVENTION

This invention relates generally to security systems for personal computers and particularly to a system which prevents unauthorized access to programs and data in a computer and which monitors computer access and usage.

BACKGROUND OF THE INVENTION

The use of security systems for personal computers is generally known in the art. For example, U.S. Pat. No. 4,951,249 discloses a computer security system which protects computer software from unauthorized access by requiring the user to supply a name and a password during the operating system loading procedure ("boot-up") of a personal computer (PC). This is accomplished by the insertion of a special card into an input/output expansion slot of the PC. During operating system loading of the PC, the basic input/output system (BIOS) scans memory addresses of the card for an identification code, which consists of a 55AA hex code. When this hex code is located, the BIOS instructions are vectored to that address and the instructions that follow that address are executed as part of the initialization routines of the system boot-up procedure.

The special card comprises a board with a read only memory (ROM) and an address decoder, and prevents system boot-up via the PC's floppy drive by intercepting the floppy drive interrupt, so that it appears to the processor that the PC does not have a floppy drive. The keyboard is also disabled by capturing the keyboard interrupt. As a result, the PC is forced to boot-up using the software on the card.

The foregoing PC security system, which utilizes a password board, is typical of many of the systems which are currently available. Password boards require a user's name and a password associated with that user's name. Only once a password board detects a valid user's name and password does it allow the PC to complete the boot-up routine. While password boards may be useful under some circumstances, they are inadequate in many respects.

For example, password boards provide security only during initialization of the PC; they provide no security for the system should the operator leave it unattended during the day. In addition, many PCs do not have an open architecture that allows additional circuit cards to be plugged into the system. Furthermore, as personal computers get smaller there are fewer slots available for upgrading the system with graphic, memory, and co-processor boards.

Also, password board security systems are placed between the operating system and any application that the user may run. While this method is compatible with MS-DOS and PC-DOS, it is not always compatible with Windows or other higher level operating systems. As usage of these other operating systems becomes more widespread, the password board security systems are of increasingly limited utility.

An additional limitation of password board security systems is that such systems do not enable monitoring of access and usage of the PC. Such systems do not create a record of both authorized and unauthorized attempts to access the PC which can later be retrieved by the PC owner or administrator.

SUMMARY OF THE INVENTION

The foregoing problems are solved and a technical advance is achieved by a method and apparatus for controlling access to a computer in which memory-resident software logic cooperates with a remote electronic key device coupled to the computer's processor, through the parallel printer port, to disable the computer unless an authorized user identification key is inserted into the key device. According to a departure in the art, the memory resident software logic is executed in the computer processor responsive to the computer's system timer interrupt for continuous, real time monitoring capability, so that upon removal of the authorized user identification key, one or more computer I/O devices are disabled. Upon reinsertion of an authorized user identification key, the computer resumes operation without requiring reinitialization.

Operation of the memory-resident software logic is transparent to the computer user and to the application programs because it is installed as a terminate-and-stay-resident (TSR) utility during the batch loading procedure of the computer's disk operating system. The logic continuously monitors the .parallel printer port of the computer to detect the presence of an authorized user identification key. The key is a specialized electronic device containing encrypted data used to identify each unique computer user. Until a user inserts a key which the logic determines is authorized to access the computer, or upon removal of an authorized key, the logic automatically suspends the operation of the computer I/O devices and the execution of the application programs. Additionally, the computer's video monitor screen is blanked and the mouse, the keyboard and the floppy disk drive are disabled.

Operation of the computer remains suspended until the memory-resident logic detects an authorized electronic key coupled through the parallel printer port, at which time the screen is refreshed and the previously disabled devices are enabled. Furthermore, any user application programs which were in operation at the time the electronic key was removed resume operation from the point at which operation was previously suspended.

The security system of the invention further includes logic for monitoring access attempts and use of the computer. A record of the identity of authorized user's accessing the computer and computer usage time is stored in the computer's memory. A similar record is kept of unauthorized user access attempts.

The security system recognizes two types of authorized user identification keys, which are system administrator keys and normal user keys. In one embodiment, the system of the invention includes two administrator and up to ninety-eight user keys. The administrator Key makes available to the user several utility menu options, which are unavailable to normal users. The utility menu options include facilities to add or delete user keys, to display access and usage records and to customize the number and selection of I/O devices to be disabled by the system.

In another aspect, the security system of the invention includes a floppy disk access board which attaches to the connection between the computer's floppy disk drive and the floppy disk controller. The floppy disk access board is used to disable the floppy disk drive and is controlled by the memory-resident logic. The board has special utility during the initial loading ("cold boot-up") of the computer's disk operating system because when the floppy drive is disabled, the computer is forced to boot-up its operating system from the hard disk drive, where the memory-resident logic of the invention is permanently stored. This prevents circumvention of the access procedures by loading an independent operating system that does not contain the security logic from the floppy disk drive.

In a preferred embodiment, the system of the invention includes apparatus for controlling user access to a computer having a processor, a system timer, a system memory and at least one I/O device connected to the processor, the processor being directed by interrupts for execution of interrupt services. A key device is connected to the processor for removably coupling data to the processor indicating a user identification. The key device includes at least one electronic key having a memory for storing the user identification, control logic connected to the key memory for reading data from and writing data to the key memory, and a connector including control lines for coupled to the control logic, and a data I/O coupled to the memory. The key device further includes a jack for receiving the connector, and a cable connecting the jack to the parallel printer port of the computer. A data file of authorized user identifications is stored in the computer's memory. Software logic is stored in the system memory and executed in the processor of the computer for capturing a system timer interrupt. Security logic stored in the system memory is executed in the processor responsive to the system timer interrupt for reading the user identification from the key device and comparing the read identifications with the stored authorized user identifications. The logic disables at least one I/O device of the computer when the read identification fails to match the stored identification, thereby controlling access to the computer. Access circuitry connected between the computer's mass storage device and a controller is utilized to selectively disable the mass storage device, responsive to the security logic.

An important technical advantage achieved with the invention is the ability to suspend operation of a computer by removing the user identification key and then upon reinsertion of the key, continue operation without reinitializing the computer.

Another technical advantage achieved with the invention is ready adaptability of the system to commercially available personal computers. The key device of the system is connected to the parallel printer port without disabling the printer, and the system does not require the use of an expansion slot.

Another technical advantage achieved with the invention is the ability of the monitoring facilities to create an audit record of computer user identification and access time information.

BRIEF DESCRIPTION OF THE DRAWINGS

FIGS. 7a–7d depict the source code and JEDEC fuse list used in programming the PAL circuit of FIG. 4;

FIG. 8 is a flowchart illustrating logic of a device driver routine (LOCK-IT.SYS) implemented in the PC of FIG. 1;

FIGS. 9a and 9b are flowcharts illustrating logic of an access prevention routine (FIRMLOC.EXE) implemented in the PC of FIG. 1;

FIG. 10a and 10b are flowcharts illustrating logic of a loader routine (BLOCKIT.EXE) for loading a memory resident security routine (MRSR) and for capturing a system timer interrupt, implemented in the PC of FIG. 1;

FIGS. 13a–13f illustrate selected menu screens of system utilities implemented in the PC of FIG. 1.

DESCRIPTION OF THE PREFERRED EMBODIMENT

Figure 1A:
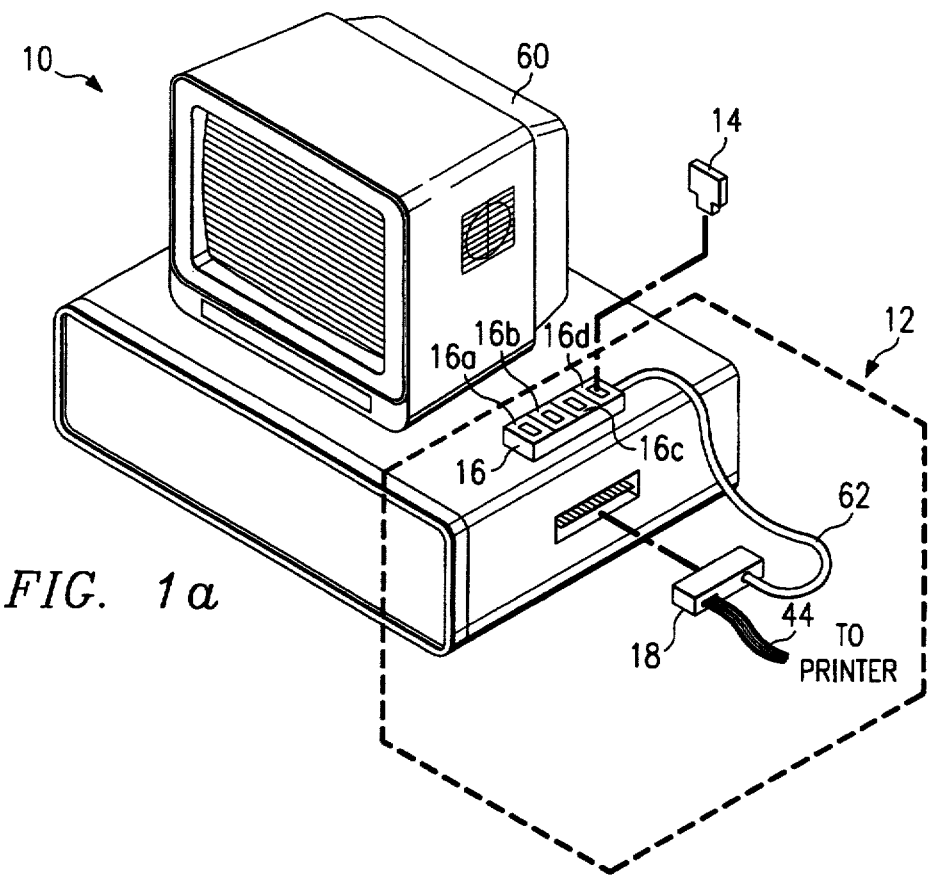
FIG. 1a is a perspective view of a personal computer (PC) incorporating the security and monitoring features of the present invention.
Figure 1B:
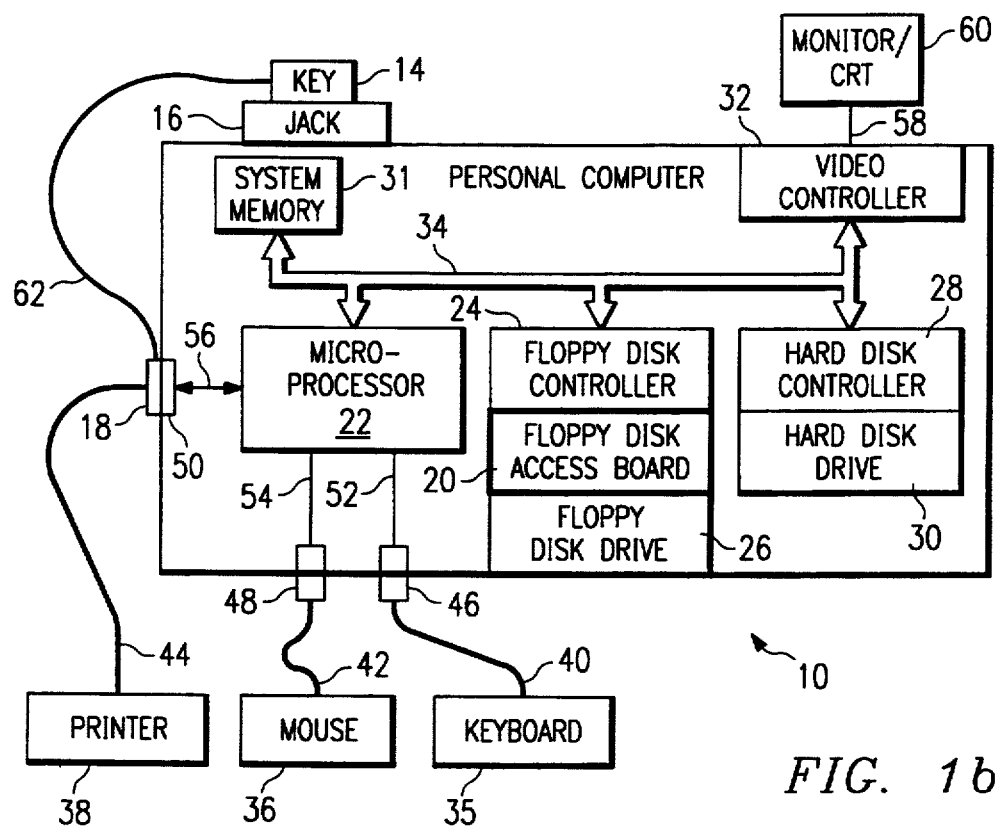
FIG. 1b is a functional block diagram of the PC of FIG. 1.

FIGS. 1a and 1b illustrate a personal computer (PC) 10 which is modified in accordance with the invention to prevent unauthorized access to its data and programs and which incorporates features for controlling and monitoring computer usage. The reference numeral 12 designates generally a system of the present invention for providing these controlled access and monitoring functions. The system 12 includes an electronic key 14, a jack 16, a parallel printer port adapter 18 and a floppy disk access board 20 (FIG. 1b). Although not shown, it is understood that logic routines implemented by computer program instructions in the PC 10 also comprise part of the system 12.

The PC 10 includes a microprocessor 22, a floppy disk controller 24, a floppy disk drive 26, a hard disk controller 28, a hard disk drive 30, a system memory 31, and a video controller 32. An internal data bus 34 interconnects the foregoing components in a conventional manner. Peripheral devices connected to the PC 10 include a keyboard 35, a mouse 36 and a printer 38. Lines 40, 42 and 44 respectively connect the keyboard 35, mouse 36, and printer 38 to a port 46, a port 48 and a printer port 50, respectively. Bus lines 52, 54 and 56 respectively connect the ports 46, 48 and 50 to the microprocessor 32, A line 58 connects the video controller 32 to a monitor 60. All of the foregoing components are well known and therefore are not described in further detail.

Figure 1C:
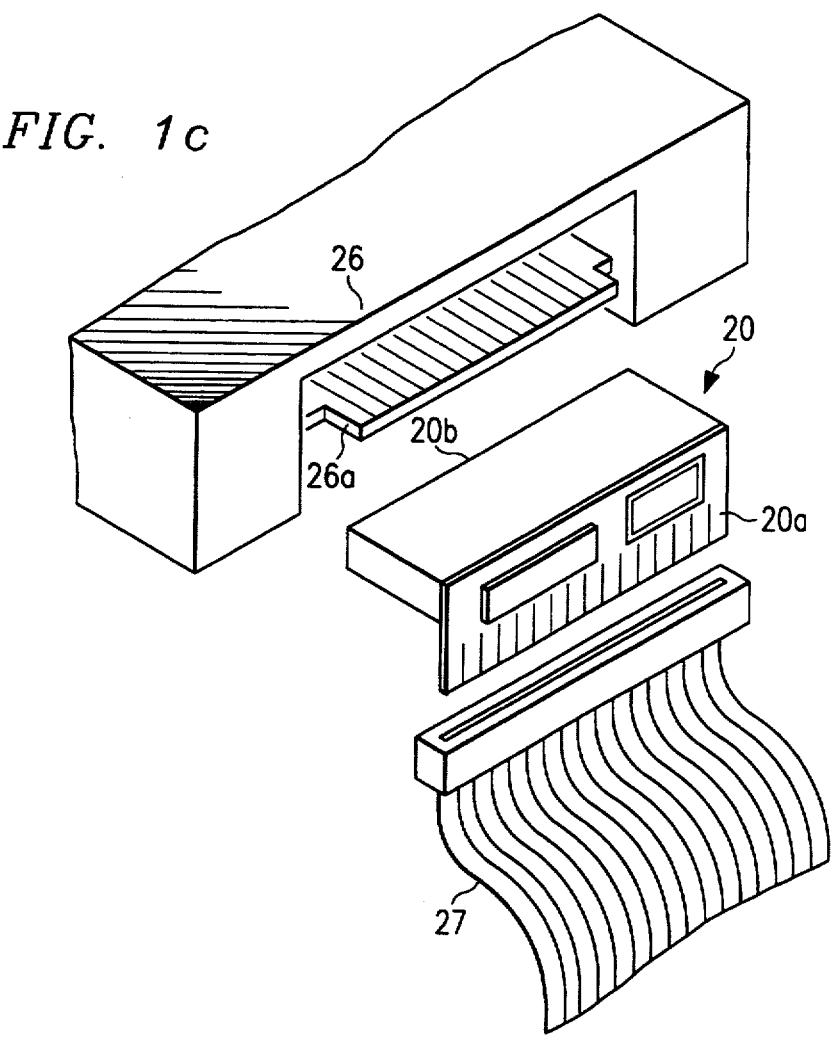
FIG. 1c is an enlarged and partially broken-away, perspective view of a floppy disk access board and other components of the PC of FIG. 1.

As shown also in FIG. 1c, the floppy disk access board 20 of the system 12 is connected between the floppy disk controller 24 and the floppy disk drive 26. A floppy drive cable 27 extending from the controller 24 connects to a plug connector 20a of the access board 20 and a plug 26a of the drive 26 connects to a socket connector 20b of the access board 20. The board 20 prevents loading of the disk operating system (not shown) of the PC 10 from the drive 26 and causes such loading from the hard disk drive 30, thereby preventing circumvention of the access and monitoring features of the present invention.

While not shown, in an alternative embodiment, the floppy disk access board 20 may comprise part of the floppy disk cable 27 normally connecting the floppy disk drive 26 to the floppy disk controller 24. In this configuration, the board 20 may be installed in computers where internal space limitations prevent the floppy disk access board 20 from being attached directly to the floppy disk drive 26 via the connector 26a. The floppy disk access board 20 may then be placed wherever space inside the computer permits such placement.

The parallel printer port adaptor 18 connects the printer 38 through line 44 to the port 50 and also connects the jack 16 to the port 50 through a line 62. The jack 16 may be taped, glued, or otherwise affixed to a convenient location on the PC 10 as shown in FIG. 1a, or placed in another suitable location on or near the PC 10.

The jack 16 includes one or more slots 16a–16d for receiving the key 14. The multiple slots 16a–16d are identical, it being understood that only one slot is needed to operate the system. Multiple slots are provided to accommodate normal wear associated with inserting the key 14. As will be described subsequently in detail, multiple keys 14 (up to 100) are assignable to individual users, each key 14 being separately identifiable. Programming within the system 12 enables names to be associated with each key 14 for user identification. One or more keys 14 are encoded as a "system master" or administrator level key, and the remaining keys are encoded as user level keys. The key 14 is an electronically encrypted device which stores separately identifiable codes, and is described in greater detail with references to FIG. 3. In another embodiment, the floppy disk access board 20 may be incorporated into the motherboard (not shown) of the PC 10, thereby eliminating most space limitations.

It is understood that computer program instructions for implementing various functions of the system 12 reside on the hard disk drive 30. The program instructions are initially loaded onto the drive 30 from a floppy disk (not shown) through the floppy disk drive 26. The program instructions are accessed for implementation by the microprocessor 22 through the system memory 31.

In the present embodiment, the PC 10 is an IBM-compatible computer using either MS-DOS or PC-DOS as its disk operating system stored in the system memory 31. Since the relevant PC-DOS modules are identical to those of MS-DOS modules for purposes of the present invention, only the latter will be discussed. MS-DOS consists of three major software modules. These are MS-DOS BIOS, the MS-DOS kernel, and the MS-DOS command shell interpreter. The MS-DOS file names for the preceding modules are IO.SYS, MSDOS.SYS, and COMMAND.COM, respectively.

The IO.SYS file contains the MS-DOS BIOS and the MS-DOS initialization module, SYSINIT. MS-DOS BIOS consists of a list of memory resident device drivers and an additional initialization module. The MS-DOS kernel, MSDOS.SYS, is the heart of MS-DOS and provides the functions found in traditional disk operating systems. The kernel provides support functions or system functions to application programs in a hardware-independent manner by relying on the driver routines in the MS-DOS BIOS to perform physical input and output operations. The command shell interpreter, COMMAND.COM, is the first program started by MS-DOS after the MS-DOS BIOS and MS-DOS kernel have been loaded and initialized. COMMAND.COM provides a command-oriented interface between the kernel and the computer system operator and provides a mechanism to modify the operation of the MS-DOS BIOS and kernel. CONFIG.SYS is a text file containing command options that can modify the size or configuration of internal MS-DOS tables and cause additional device drivers to be loaded. The foregoing elements of MS-DOS or PC-DOS are well known and therefore are not described further.

Figure 2:
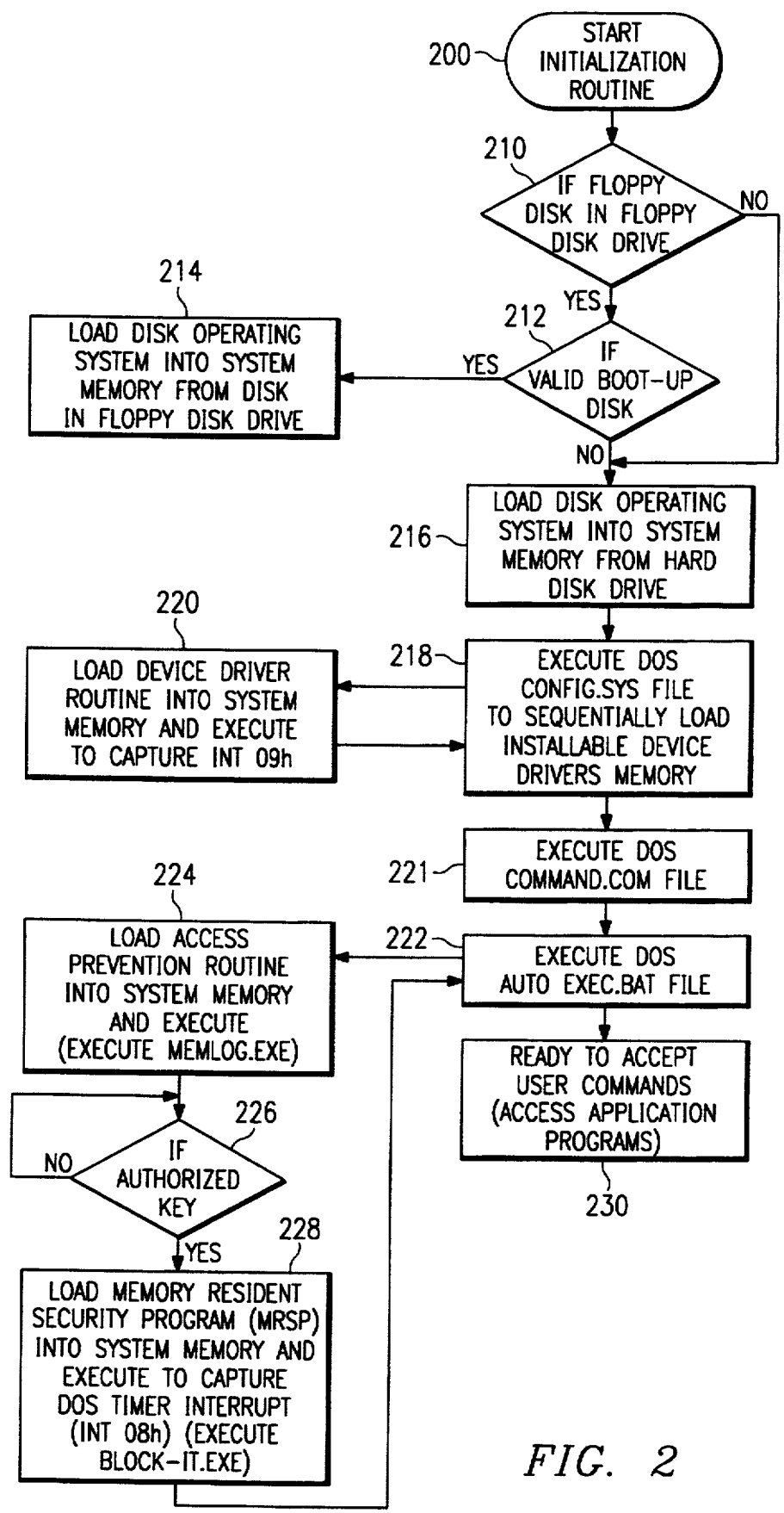
FIG. 2 is a flowchart illustrating logic of an initialization routine implemented in the PC of FIG. 1.

FIG. 2 is a flowchart of the initialization routine of the disk operating system for the PC 10 incorporating features of the present invention. It is understood that this routine is implemented when the software program instructions of the system 12 reside in the hard disk drive 30, having previously been loaded through the drive 26 from a disk (not shown).

In step 200, a cold boot-up begins by applying power to the PC 10. In step 210, the ROM BIOS starts the bootstrap procedure by executing the ROM loader routine which first checks the floppy disk drive 26 to determine whether there is a floppy disk in the floppy disk drive 26. If there is not a floppy disk in the floppy disk drive 26, execution proceeds to step 216 and the PC 10 boots-up from the hard disk drive 30. If in step 210 a floppy disk is detected in the floppy disk drive 26, execution proceeds to step 212.

In step 212, the PC 10 reads the floppy disk to determine whether it is a valid boot-up disk. A valid boot-up disk is defined as a floppy disk containing the required operating system files to install an operating system in the PC's 10 memory. If in step 212 it is determined that the floppy disk is a valid boot-up disk, then execution normally proceeds to step 214. In step 214 the PC 10 boots-up from the floppy disk drive 16.

According to a feature of the present invention, the PC 10 will be prevented from performing a cold boot-up from the floppy disk drive 26 by the floppy drive access board 20, whether or not there is a bootable disk in the floppy disk drive 26. Consequently, in step 212, the PC 10 will always determine that the floppy disk in the floppy disk drive 26 is not a bootable disk and execution proceeds to step 216.

In step 216, a cold boot-up from the hard disk drive 30 is performed. In step 218, the DOS initialization routine, SYSINIT, opens the CONFIG.SYS file, the contents of which are executed sequentially in order to load the installable device drivers into the system memory 31.

In step 220, a device driver of the present invention, LOCK-IT.SYS is loaded into the system memory 31 during execution of CONFIG.SYS. LOCK-IT.SYS will be discussed further with reference to FIG. 8. After LOCK-IT,SYS is loaded, execution returns to step 218 where the remaining device drivers are loaded into memory. In step 221, the DOS COMMAND.COM file is loaded and executed. In step 222, the DOS AUTOEXEC.BAT file is executed. AUTOEXEC.BAT is an optional batch file which contains a series of commands which are automatically executed when the PC 10 is turned on or rebooted. The present invention is designed such that the first two commands in the AUTOEXEC.BAT file are to execute the FIRMLOC.EXE program and the BLOCK-IT.EXE program; therefore, execution proceeds immediately to step 224.

In step 224, the FIRMLOC.EXE program, discussed in greater detail with reference to FIGS. 9a and 9b, is loaded into memory and executed. In step 226, if an authorized electronic key 14 is detected on the parallel port 50, FIRMLOC.EXE terminates and execution proceeds to step 228. If in step 226 an authorized electronic key 14 is not detected, execution loops back to step 226 until an authorized electronic key 14 is detected.

In step 228, the BLOCK-IT.EXE program, which will be discussed in greater detail with reference to FIGS. 10a and 10b, is loaded and executed. After BLOCK-IT.EXE captures DOS interrupt 08h and loads the memory resident security program into the system memory 31, the program terminates and execution returns to step 222 where the remaining commands in the AUTOEXEC.BAT file are executed. After the remainder of the AUTOEXEC.BAT file has been executed, execution proceeds to step 230, at which point the PC 10 is ready to accept commands from the user.

Figure 3:
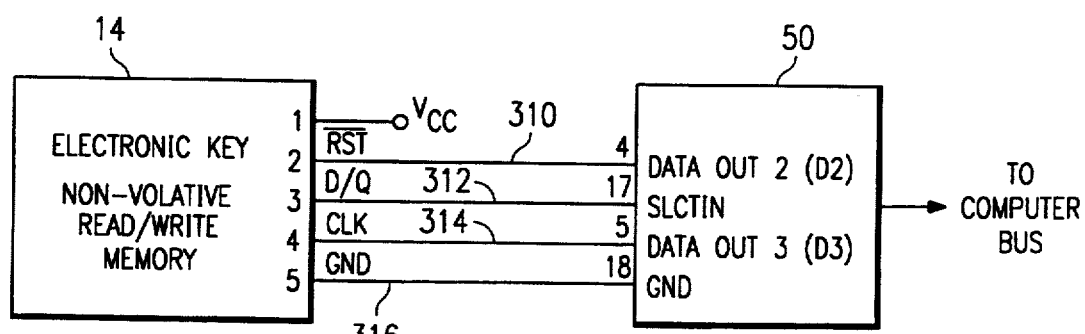
FIG. 3 is a functional block diagram showing the connections between an electronic key and a parallel printer port of the PC of FIG. 1.

FIG. 3 is a schematic diagram of the connections between the electronic key 14 and the parallel printer port 50. While not shown, it is understood that these connections are made through the jack 16 and the adaptor 18. In one embodiment, the electronic key 14 is a miniature security system which stores 64 bits of user definable identification Code and a 64 bit security match code which protects 128 bits of read/write non-volatile memory. The 64-bit identification code and the security match code are programmed into the the electronic key 14 via a special program mode operation. After programming, the electronic key 14 follows a special communication procedure with a serial format to retrieve or update the data stored in the electronic key 14. The electronic key 14 is designed to be plugged into the jack 16, which is a standard 5 pin 0.1 inch center SIP receptacle. A guide is provided to prevent the electronic key 14 from being plugged in backwards and aids in alignment of the electronic key 14 to the jack 16. In one embodiment, the key 14 is manufactured by Dallas Semiconductor. The circuitry of the key 14 is described in Dallas Semiconductor technical bulletin DS1204U.

Pins 2, 3, 4, and 5 of the electronic key 14 are connected to pins 4, 17, 5, and 18 of the parallel printer port 22 by lines 310, 312, 314, and 316, respectively. Pin 1 of the electronic key 14 is not connected to the parallel printer port 22 because pin 2 is an alternate power supply for the key 14, as described in the aforementioned technical bulletin.

Figure 4:
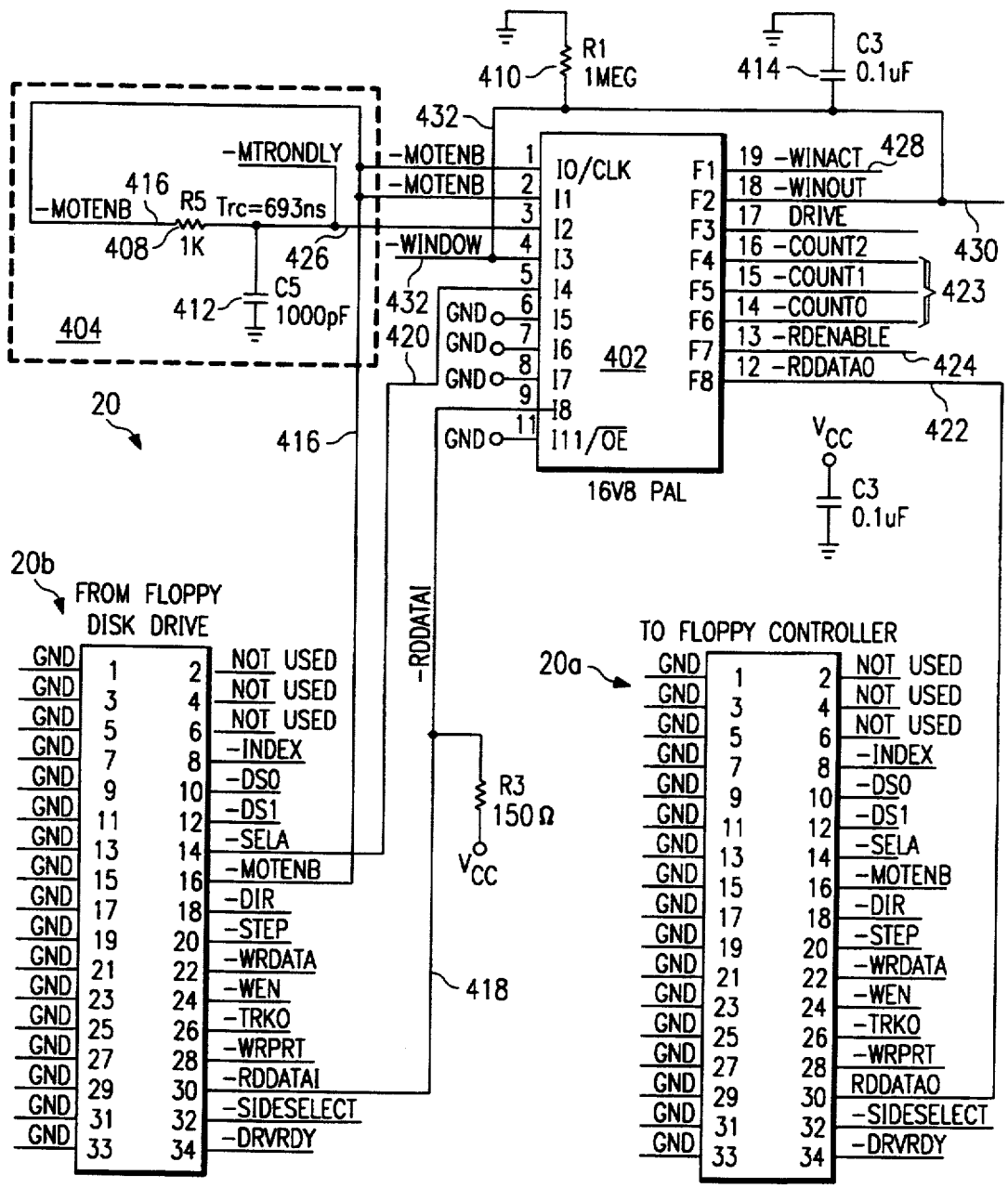
FIG. 4 is a schematic diagram of a programmable array logic (PAL) circuit of a floppy disk access board of the PC of FIG. 1.

FIG. 4 is a schematic diagram of the floppy disk access board 20. The floppy disk access board 20 comprises a programmable array logic (PAL) 402 circuit, a low-pass filter 404, the two connectors 20a and 20b, resistors 408, 410 and capacitors 412, 414. The connector 20b is connected to the floppy disk drive 26 and the connector 20a is connected to the floppy disk controller 24.

The majority of the Signals of connector 20b from the floppy disk drive 26 are passed directly to the connector 20a via a bidirectional bus (not shown); however, the motor-enable-B signal (MOTENB) signal, the read-data-in signal (RDDATAI) signal, and the drive-select-A signal (SELA) signal on pins 16, 30, and 14, respectively are intercepted and passed on lines 416, 418, and 420, for processing by the PAL 402.

Similarly, the majority of signals of the PAL 402 are not connected to external devices, but are used internally by the PAL 402, with the exception of the RDDATAI signal on pin 9 of the PAL 402, which is connected via line 418 to pin 30 of the connector 20b and the read-data-out (RDDATAO) signal on pin 12 of the PAL 402, which is connected via line 422 to pin 30 of connector 20a. The three counter signals 0-2 on pins 14-16 of the PAL 402, designated collectively by lines 423, are used by the internal state machine of the PAL 402, as will be described.

The read-enable (RDENABLE) signal on pin 13 of the PAL 402 on line 424 is used internal to the PAL 402 to control the RDDATAO signal on pin 12, and is active low. When the RDENABLE signal On line 424 is in the active state, it allows the RDDATAI signal (pin 9) on line 418 to be passed by the PAL 402 to produce the RDDATAO signal on line 422. Similarly, when the RDENABLE signal on line 424 is in the inactive state, the RDDATAI signal on line 418 is prevented from being passed by the PAL 402 and the RDDATAO signal on line 422 is not produced.

The SELA signal line 420 is used by the PAL 402 to disable the RDDATAO signal line 422 when the RDENABLE signal line 424 is in the active state. This allows the PAL 402 to prevent data from being transferred from any other floppy drive which might be present on the floppy drive data bus (not shown) to the floppy disk controller 24 when the floppy disk access board 20 is disabled, allowing the floppy disk access board 20 to disable any floppy disk drive 26 from which boot-up might be attempted.

The MOTENB signal online 416 (pin 16 of the connector 20b) is connected to both pin 1 and pin 2 of the PAL 402 and is used by the PAL 402 as a clock input to control the state machine internal to the PAL 402. The MOTENB signal on line 416 is also connected to a low pass filter 404 comprised of the input resistor 408 and the capacitor 412. The output of the filter 404 is designated as the motor-on-delay (MTRONDLY) signal on line 426 and is connected to pin 3 of the PAL 402. The MTRONDLY signal on line 426, in combination with the MOTENB signal on line 416, is used internal to the PAL 402 to initiate a window activate (WINACT) signal at pin 19, on line 428. The WINACT signal on line 428 is then used to generate a window-out (WINOUT) signal at pin 18, on line 430, that is used to charge the capacitor 414 for a length of time defined by the WINACT signal. The WINOUT signal on line 430 decays to ground through the resistor 410 resulting in a window (WINDOW) signal on line 432 which is connected to pin 4 of the PAL 402.

Figure 5:
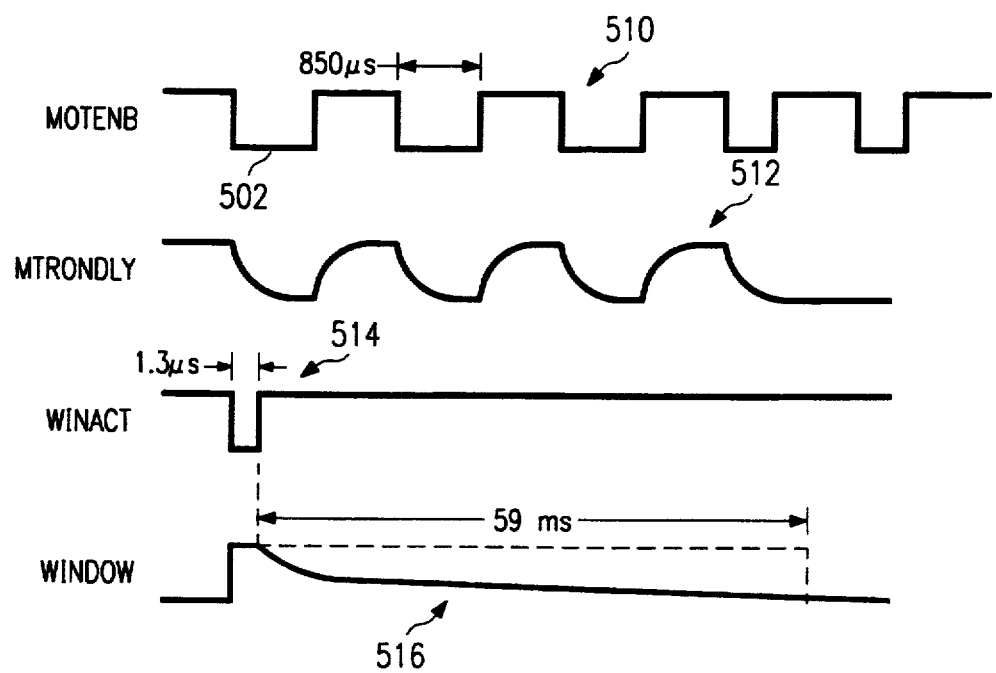
FIG. 5 is a timing diagram illustrating the timing relationship of selected signals of the PAL circuit of FIG. 4.

FIG. 5 illustrates the timing relationship of selected signals shown in FIG. 4. The MOTENB signal on line 416, illustrated by a waveform 510, is used by the PAL 402 as a clock input. The MTRONDLY signal on line 426, illustrated by a waveform 512, is a MOTENB signal after having undergone an RC decay with a time constant of approximately 1.3 microseconds. The MTRONDLY signal on line 426 is used to generate the WINACT signal on line 428, illustrated by a waveform 514. The WINACT signal is generated when the MOTENB signal on line 416 first goes low and the MTRONDLY signal on line 426 is high, indicated by reference numeral 502. The WINACT signal on line 428 is used to generate the WINOUT signal on line 430 which, in turn, charges the RC network comprised of a resistor 40 and a capacitor 414 to create the WINDOW signal on line 432. The WINDOW signal is used by the floppy disk access board 20 as a 69 millisecond (ms) timer. During this 69 ms, the number of MOTENB signal pulses on line 416 are counted by the internal state machine of the PAL 402 in order to determine whether to activate or deactivate the RDENABLE signal on line 424, as will be described in further detail with reference to FIG. 6b.

During normal Operation of the PC 10, a pulse is generated on the MOTENB signal line 416 whenever the microprocessor 22 tries to access the floppy disk drive 26. The WINDOW signal on line 432 is used by the floppy disk access board 20 to distinguish pulses on the MOTENB signal line 416 generated by the memory resident security program of the present invention, which occur as rapid sequences of a predetermined number of pulses, from normal attempts by the microprocessor 22 to access the floppy disk drive 26, which are single pulses occurring at random intervals.

Figures 6A, 6B:
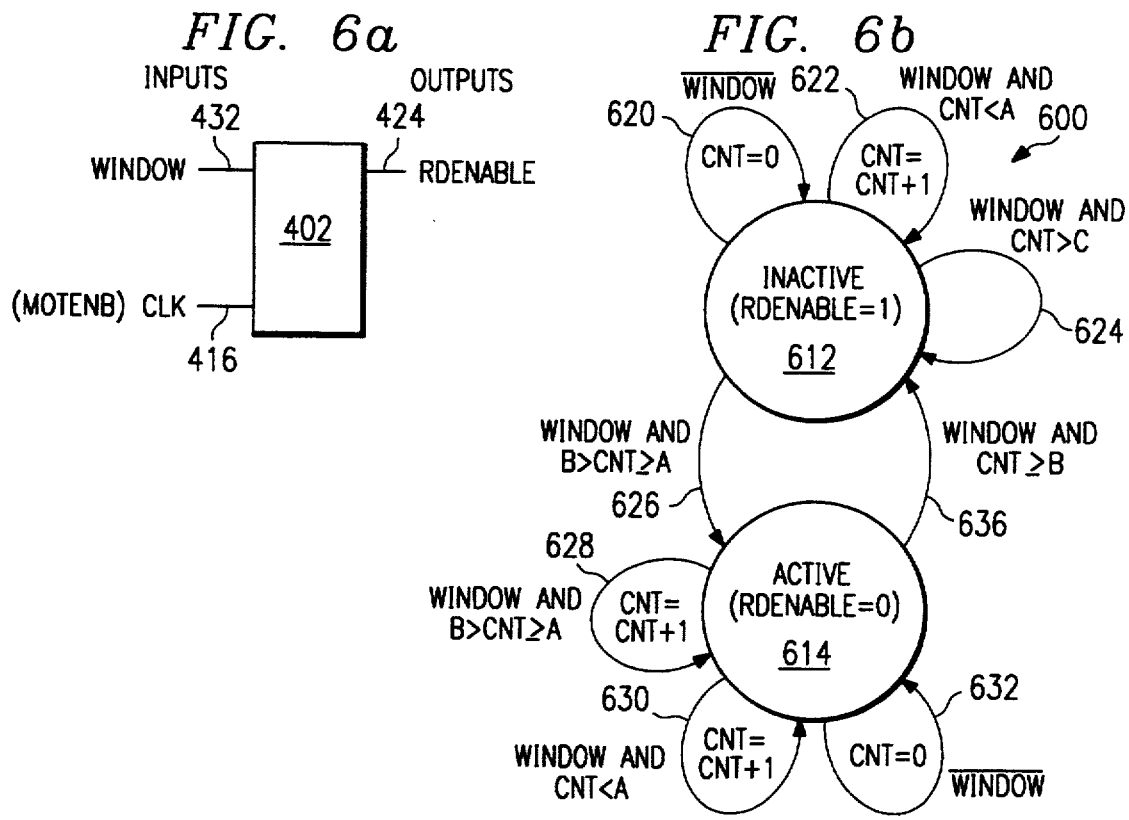
FIGS. 6a and 6b respectively illustrate a functional block diagram and a state diagram (or Mealy machine) of the floppy disk access board of the PC of FIG. 1.

FIG. 6a depicts a basic input/output (I/O) block diagram of the floppy disk access board 20. There are two input signals, the WINDOW signal on line 432 and the MOTENB signal on line 416, and one output signal, the RDENABLE signal on line 424.

FIG. 6b depicts a Mealy machine or state diagram 600 of the floppy disk access board 20 as depicted in FIG. 6a. The Mealy machine 600 indicates two states, which are an inactive state 612 (RDENABLE=1) and an active state 614 (RDENABLE=0). When the machine 600 is in the inactive state 612, the floppy disk drive 26 is disabled and when it is in the active state 614, the floppy disk drive 26 is enabled. When power is initially applied to the floppy disk access board 20, the Mealy machine 600 is in the inactive state 612. As a result, data on the RDDATA1 signal on line 418 is not passed to the RDDATA0 on line 422 and during the cold boot-up of the PC 10, it will appear to the microprocessor 22 that a bootable disk is not present in the floppy disk drive 26. This causes the PC 10 to boot from the hard disk drive 30 and to install the security software of the present invention.

If the machine 600 is in the inactive state 612 and receives a pulse on the MOTENB signal line 416 and the WINDOW signal line 432 is inactive, the machine takes a transition path 620, initializes a counter (CNT) (not shown) to zero and returns to the inactive state 612. The CNT is used to record the number of pulses received on the MOTENB signal line 416 during the 69 milliseconds that the WINDOW signal line 432 is active. In one embodiment, if CNT is equal to a number A, the floppy disk access board 20 will be enabled, allowing data to be read from the floppy disk drive 36. If CNT is equal to a number B, the floppy disk access board 20 will be disabled, preventing data from being read from the floppy disk drive 36. CNT is reinitialized each time there is a pulse on the MOTENB signal line 416 and the WINDOW signal line 432 is inactive. The timing relationship between the MOTENB signal and the WINDOW signal was discussed previously with reference to FIGS. 4 and 5.

If the machine 600 is in the inactive state 612 and receives a pulse on the MOTENB signal line 416, the WINDOW signal line 432 is active and CNT is less than some number A, the machine 600 takes a transition path 622, increments CNT by one and returns to the inactive state 612. If the machine 600 is in the inactive state 612 and receives a pulse on the MOTENB signal line 416, the WINDOW signal line 432 is active and CNT is greater than some number C, the machine 600 takes a transition path 624 and returns to the inactive state 612. If the machine 600 is in the inactive state 612 and =receives a pulse on the MOTENB signal line 416, the WINDOW signal line 432 is active and CNT is greater than or equal to some number A, but less than some number B, the machine 600 takes a transition path 626 and transitions to the active state 614.

If the machine 600 is in the active state 614 and receives a pulse on the MOTENB signal line 416, the WINDOW signal line 432 is active and CNT is greater than some number A, but less than some number B, the machine 600 takes a transition path 628, CNT is incremented by one and the machine 600 returns to the active state 614. If the machine 600 is in the active state 614, receives a pulse on the MOTENB signal line 416, the WINDOW signal line 432 is active and CNT is less than some number A, the machine 600 takes a transition path 630, CNT is incremented by one and the machine 600 returns to the active state 614. If the machine 600 is in the active state 614 and receives a pulse on the MOTENB signal line 416 and the WINDOW signal line 432 is inactive, the machine 600 takes a transition path 634, CNT is reinitialized to zero and the machine 600 returns to the active state 614. If the state machine 600 is in the active state 614 and receives a pulse on the MOTENB signal line 416, the WINDOW signal line 432 is active and CNT is greater than or equal to Some number B, the machine 600 takes the transition path 636 and returns to the inactive state 612.

In the preferred embodiment of the present invention, the numbers A, B, and C are equal to 6, 12, and 15, respectively. These values provide for the state machine 600 of the floppy drive access board 20 logic sufficient tolerance of errors caused by noise on the internal data buses of the PC 10 , FIGS. 7a–7d depict the source code and the Joint Electronic Data Exchange Council (JEDEC) fuse list used to program the PAL 402. Referring to FIGS. 7a–7c, the numeral 700 designates the source code for the PAL 402. A series of comments 710 provides the lay-out schematic for the PAL 402. The actual PAL device used, a GAL16V8 is indicated by the reference numeral 712. Instructions for the PAL program compiler developed by Orcad Software, Inc. begin in step 714 with a series of descriptions and definitions of the various input and output signals for the PAL 402. In step 716, the active state for the input and output signals are defined. The remaining PAL source code defines a series of finite state procedures 718. As PAL programming is understood by those skilled in the art, it is not described further.

FIG. 7d depicts the JEDEC fuse list generated by the PAL compiler to form a file used by a PAL programmer to program the PAL 402. As this is well understood in the art, it is not described further.

FIG. 8 is a detailed flowchart of the LOCK-IT.SYS program, a device driver that is loaded into the operating system during the execution of the CONFIG.SYS file. Execution of LOCK-IT.SYS begins in step 800. Steps 810, 812 and 814 comprise the initialization routine of LOCK-IT.SYS, which is executed once during initial loading of the LOCK-IT.SYS file. In step 810, all variables are declared and initialized for operation within DOS. In step 812, DOS interrupts 2fh and 09h are captured. The technique of capturing interrupts is well known to those experienced in the art and will not be further detailed.

Interrupt 2fh is a multiplex interrupt used to communicate with other software programs. This interrupt is used by the software programs of the present invention to perform specific functions and to transfer data from one part of the security software to another. Interrupt 2fh, commonly referred to as a "general user" interrupt, is well known to those experienced in the art. An interrupt 2fh routine of the present invention will be detailed further with reference to FIG. 11. Interrupt 09h is the keyboard interrupt and it is captured to disable the keyboard 35, allowing the security software of the present invention to be installed during boot-up of the PC 10 without the possibility of interference by the user. In step 814, the initialization of the LOCK-IT.SYS device driver program is complete and execution exits to the operating system.

FIGS. 9a and 9b are flowcharts detailing the operation of the FIRMLOC.EXE software program of the present invention. FIG. 9a illustrates the general operation of FIRMLOC.EXE, which, in essence, prevents unauthorized access to the PC 10 and to the system utilities of the present invention by requiring that an authorized electronic key 14 be present on the parallel printer port 50 at all times during PC 10 use.

Execution begins in step 910. In step 912, the parallel printer port 50 is examined to determine whether an authorized electronic key 14 has been inserted. If an authorized electronic key 14 is not detected, execution loops back to step 912 and awaits the insertion of an authorized key 14. If in step 912 an authorized electronic key 14 is detected, execution proceeds to step 914.

It is understood that there are two types of authorized electronic keys 14 which may be inserted into the jack 16, which are system administrator keys and normal user keys. The system administrator key enables a system administrator to access the PC 10 and further to access the security system utilities of the present invention, which will be detailed further with reference to FIGS. 13a-13f. Normal user keys enable a user only to access the PC 10. In step 914, a determination is made whether the authorized electronic key 14 on the parallel printer port 50 is a system administrator key. If the key 14 is not a system administrator key 14, execution proceeds to step 916; otherwise, execution proceeds to step 918.

In step 918, the security system 12 utilities of the present invention are made available to the system administrator. In general, these utilities enable the system administrator to add or delete user electronic keys 14 and examine audit trails created by the security system which contain information regarding times and dates of authorized system use, unauthorized access attempts and system boot-ups. Once the system administrator is finished with the utilities, execution proceeds to step 916 where the program exits to the operating system.

FIG. 9b depicts a more detailed flowchart of the operation of the FIRMLOC.EXE program. Execution begins in step 920 with the declaration and initialization of all necessary variables. In step 922, four things are determined, which are the version of the DOS installed on the PC 10, the environment variables, the video card type and the computer type.

In step 924, the current PC 10 time is recorded in the "boot-up log" for use in the audit trail files of the system 12 utilities. In Step 926, the parallel printer port 50 address of the PC10 is examined for the presence of an electronic key 14 using a communication protocol such as the one described in the Dallas Semiconductor technical bulletin, DS1204U. If an electronic key 14 is not detected on the parallel printer port 50, execution loops back to step 926 until an electronic key 14 is detected. Once a key 14 is detected on the parallel printer port 50, execution proceeds to step 928. In step 928, the data stored in the electronic key 14 is read and execution proceeds to step 930.

In step 930, the key 14 data is compared to the data in an authorized electronic key data file stored in the memory 31, and a determination is made whether the key 14 is authorized. If it is determined in step 930 that the electronic key 14 is not authorized, execution proceeds to step 934. In step 934 the electronic key data is recorded and stored as an unauthorized access attempt for use in creating the audit trail of the system utilities, and execution returns to step 926.

If it is determined in step 930 that electronic key 14 on the parallel printer port 50 is an authorized electronic key 14, execution proceeds to step 932. In step 932 a determination is made whether the electronic key 14 is a system administrator key. If so, execution proceeds to step 936. In step 936, the keyboard 35 is enabled by calling interrupt 2fh, with the ax register equal to EE01h and the low byte, dl, of the dx register equal to 1. This will restore the previously stored interrupt. The operation of the interrupt 2fh routine will be explained in detail with reference to FIG. 11. Next, the security system 12 utilities are provided to the system administrator. When the system administrator exits the security system 12 utilities, the keyboard 35 is again disabled by calling interrupt 2fh, with the ax register equal to EE01h and the dl register equal to 0, this capturing INT09h thus disabling the keyboard, and execution proceeds to step 938. Similarly, if in step 932 it is determined that the electronic key 14 is not the system administrator electronic key 14, execution proceeds to step 938.

In step 938, a data file relating to authorized system use is updated and stored. In addition, the parallel printer port 50 address, the interrupt request (IRQ) mask byte, and the number of authorized electronic keys are transferred to and stored in memory 31 by calling interrupt 2fh with the ax register equal to EE02h and the bx, cx, and dl registers equal to the printer port 50 address, the IRQ mask byte, and the number of authorized electronic keys respectively. In step 940, the FIRMLOC.EXE program exits to the operating system.

FIGS. 10a and 10b are flowcharts detailing the operation of the BLOCK-IT,EXE program. FIG. 10a depicts the general operation of BLOCK-IT.EXE, the primary purpose of which is to capture the system timer interrupt, interrupt 08h, and to load the memory resident security program of the present invention into system memory 31. Execution of BLOCK-IT.EI begins at step 1010. In step 1012, interrupt 08h is captured, causing the memory resident security program to be executed on every system timer interrupt after the initial execution of BLOCK-IT.EXE. The system timer interrupt is a hardware interrupt which occurs approximately 18.2 times per second, or every 55 ms, regardless of what other operations the PC may be performing.

Figures 12A, 12B:
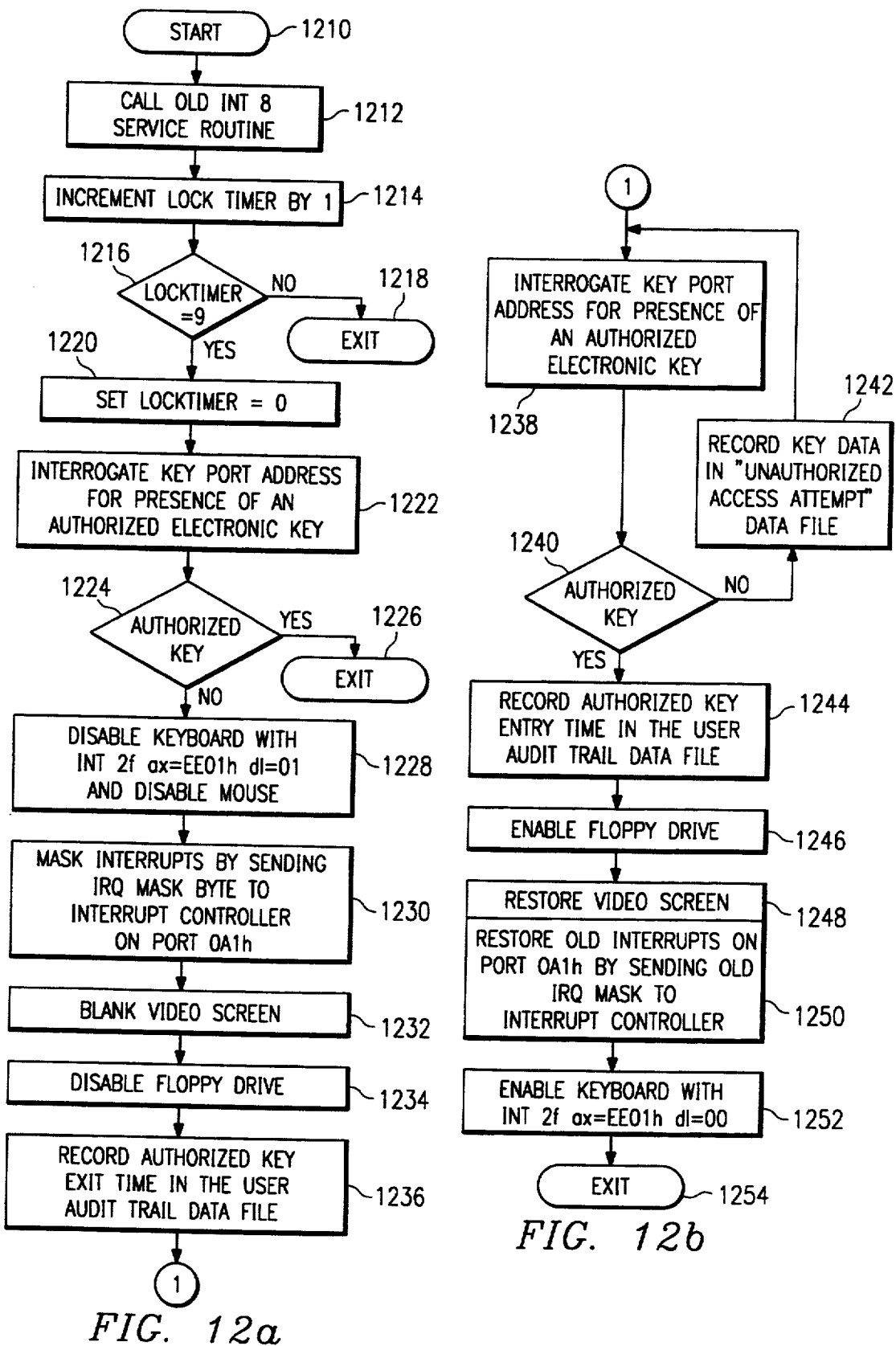
FIGS. 12a and 12b is a flowchart illustrating logic of a memory resident security routine(MRSR) implemented in the PC of FIG. 1.

In step 1014, the memory resident security program is loaded into system memory 31. The memory resident security program will be explained in further detail with reference to FIGS. 12a and 12b. In step 1016, execution of BLOCK-IT.EXE terminates and exits to the operating system.

FIG. 10b is a more detailed flowchart of the operation of BLOCK-IT.EXE. Execution begins in step 1020 with the declaration and initialization of all necessary variables; in particular, a counter variable designated as "LockTimer" is set to zero. The operation of Lock-Timer will be subsequently discussed in detail with reference to FIG. 12. In step 1022, the parallel printer port 50 address, the IRQ mask byte, and the number of authorized electronic keys 14 are placed in the dx, bx, and cl registers respectively by calling interrupt 2fh with the ax register equal to EE03h.

In step 1024, the parallel printer port 50 address is examined to detect the presence of an authorized electronic key 14 per the previously identified communication protocols. In step 1024, if an authorized key 14 detected, execution proceeds to step 1026; otherwise, execution loops back to step 1024 until an authorized key 14 is detected and execution proceeds to step 1026.

In step 1026, the authorized key 14 name and the system time are recorded for use in creating an audit trail for the system utilities. In step 1028, interrupt 08h is captured. The capture of the system timer interrupt will force the memory resident security routine to be executed on every system timer interrupt after the initial BLOCK-IT.EXE program execution. In step 1030, the BLOCK-IT.EXE program terminates and exits to the operating system. When the BLOCK-IT.EXE program terminates, the memory resident security routine stays resident in the system memory 31 of the PC 10.

Figure 11:
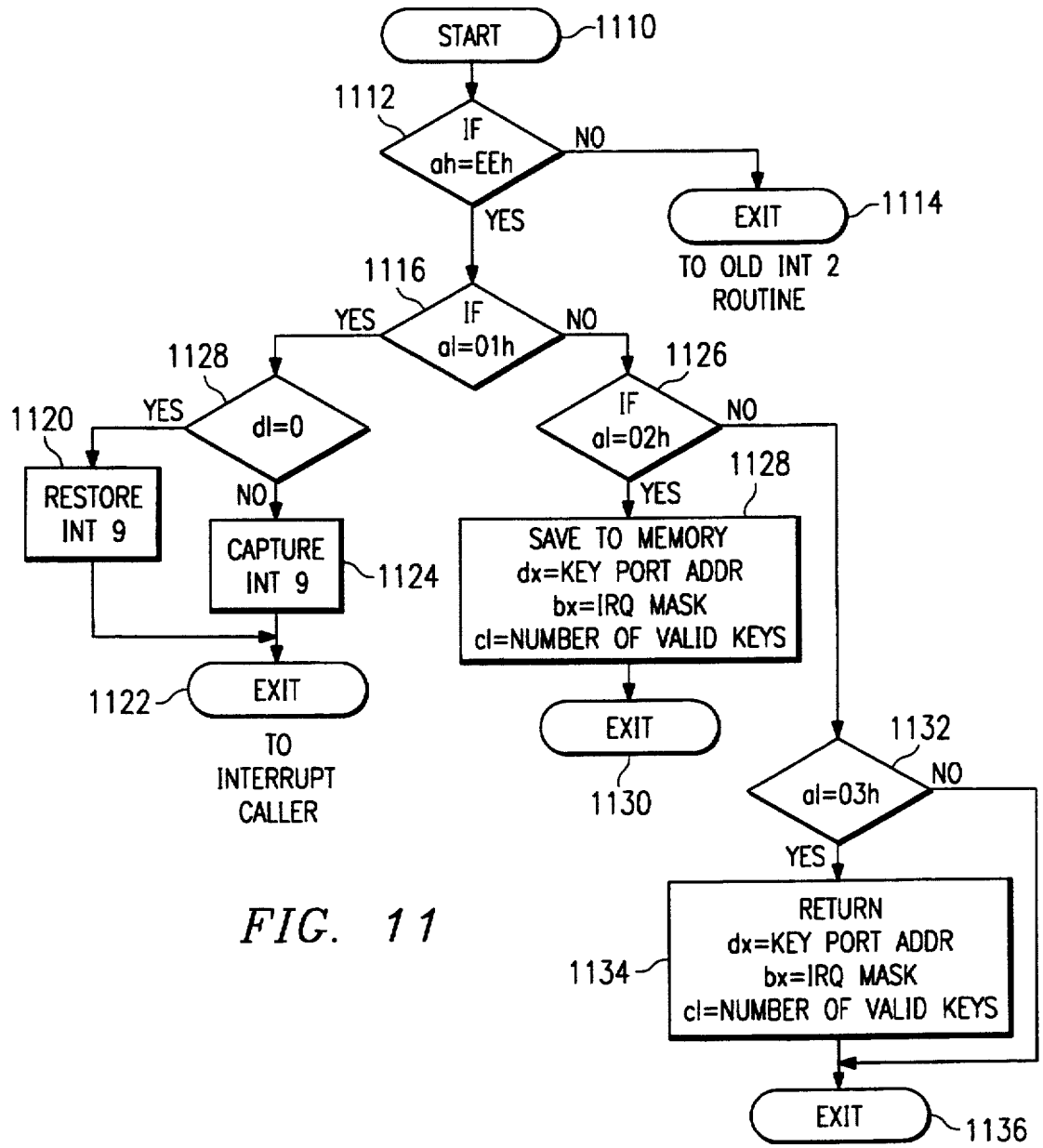
FIG. 11 is a flowchart illustrating logic of a memory resident Interrupt 2fh routine implemented in the PC of FIG. 1.

FIG. 11 is a flowchart of the interrupt 2fh routine. As indicated with reference to FIG. 2, the interrupt 2fh routine is used to disable or enable the keyboard 35 and to save to or retrieve from system memory 31 the parallel printer port 50 address, the IRQ mask byte and the number of authorized keys for use by the software programs of the system 12. The interrupt 2fh routine is called during initial boot-up in step 220 of FIG. 2 during execution of the device driver routine (LOCKIT.SYS) to disable the keyboard 35 and also in step 938 of FIG. 9b during execution of the 10ad access prevention routine (FIRMLOC.EXE) to save or retrieve the port 50 address, IRQ mask byte and number of keys. When the operating system makes an interrupt 2fh call, the interrupt 2fh routine begins at step 1110. In step 1112, if the high byte, ah, of the ax register is equal to EEh, execution proceeds to step 1116. If ah is not equal to EEh, execution proceeds to step 1114. In step 1114, execution exits to the original interrupt 2fh service routine.

In step 1116, if the low byte, al, of the ax register is equal to 1, execution proceeds to step 1118. In step 1118, if the low byte, dl, of the dx register is equal to 0, then execution proceeds to step 1120. In step 1120, the keyboard interrupt, interrupt 09h, which was captured during the execution of LOCK-IT.SYS, is restored, thereby enabling the keyboard 35. Execution then proceeds to step 1122 where the interrupt 2fh routine terminates and exits to the operating system. If in step 1118 the low byte, dl, of the dx register is equal to 0, execution proceeds to step 1124. In step 1124, interrupt 09h is captured, disabling the keyboard 35, and execution exits to the operating system in step 1122.

If in step 1116, the low byte, al, of the ax register is not equal to 1, execution proceeds to step 1126. In step 1126, if the low byte, al, of the ax register is equal to 2, execution proceeds to step 1128. In step 1128, the values contained in the dx, the bx and the cl registers, which are equal to the parallel printer port 50 address, the IRQ mask byte used by the security software to mask specific hardware interrupts so as to disable the particular I/O devices that generate those interrupts, and the number of the authorized electronic keys 14 for the security system 12, respectively, are stored in system memory 31. In step 1130, execution exits to the operating system. Exiting to the operating system is understood to mean that under the control of the operating system, execution returns to the calling program.

If in step 1126, the low byte, al, of the ax register is not equal to 2, execution proceeds to step 1132. In step 1132, if the low byte, al, of the ax register is equal to 3, execution proceeds to step 1134. In step 1134, the previously stored values of the parallel printer port 50 address, the IRQ mask byte, and the number of valid electronic keys are returned in the dx, bx, and cl registers respectively. In step 1136 execution exits to the operating system. If in step 1132, the low byte, al, of the ax register is not equal to 3, execution proceeds directly to step 1136 and exits to the operating system.

FIG. 12 depicts a detailed flowchart of the memory resident security routine. In the present invention, the memory resident security program continuously monitors the parallel printer port 50 of the PC 10 to detect the presence of an authorized key 14. The memory resident security routine is loaded into the memory 31 of the PC 10 during the execution of the BLOCK-IT.EXE program, as discussed previously with reference to FIGS. 10a and 10b. The memory resident security program is designed so that it is "hooked" into the system timer interrupt (Int.08h), causing the memory resident security routine to be executed on every system timer interrupt. This process of capturing an interrupt entails changing the interrupt vector table (IVT) entry stored in the system memory 31 for the interrupt. To capture an interrupt, the initialization code of a TSR utility reads the IVT entry, stores its contents in a data area, and inserts a new address in the IVT, Control will then pass to this new interrupt service routine the next time the interrupt occurs. The technique of capturing an interrupt is well known to those experienced in the art and will not be discussed further.

The execution of the memory resident security program is automatic and is transparent to the computer user and any application program which may be running on the PC 10. By incorporating the memory resident security program with the system timer interrupt, the security program becomes an integral part of the operating system of the PC 10.

The routine begins in step 1210 and is initiated by a system timer interrupt generated by the PC 10 every 55 milliseconds. In step 1212, the original system timer interrupt routine is executed. In step 1214, a counter designated as "LockTimer", the initialization of which was previously discussed with reference to FIG. 10b, is incremented by 1. In step 1216, LockTimer is inspected to determine if it is equal to 9. If LockTimer is not equal to 9, execution proceeds to step 1218. In step 1218, the memory resident security program terminates and exits to the operating system. If in step 1216, LockTimer is equal to 9, execution proceeds to step 1220 where Lock-Timer is reset to 0. Steps 1214 through 1220 illustrates the use of LockTimer in implementing a half second timer used to control the frequency with which the memory resident security program checks the parallel printer port 50 for an electronic key 14. The aforementioned steps cause the memory resident security program to be executed every 9 system timer interrupts, or approximately every half second.

In step 1222, the data is read from the electronic key 14 present on the parallel printer port 50 of the PC 10. In step 1224, it is determined whether the electronic key 14 present on the parallel printer port 50 is an authorized key 14. If it is an authorized key 14, execution proceeds to step 1226, In step 1226, the memory resident security program terminates and exits to the operating system.

If in step 1224 it is determined that the electronic key 14 present on the parallel printer port 50 is not an authorized key 14, or if there is no key 14 detected on parallel printer port 50, execution proceeds to step 1228. In step 1228, the keyboard 35 is disabled by calling interrupt 2fh, with the ax register equal to EE01h and the dl register equal to 1. The mouse 26 is also disabled, using one of the various techniques well-known to those experienced in art and therefore not described herein. In step 1230, miscellaneous hardware interrupts are disabled by transmitting the IRQ mask byte to the interrupt controller in the PC 10. This technique is also well known to those experienced in the art and will not be discussed further. The IRQ mask byte is a variable which is defined by the system administrator through use of the security system utilities described in further detail with reference to FIG. 13f.

Upon completion of step 1230, execution proceeds to step 1232 where the video monitor 60 screen is blanked, using a technique well known to those experienced in the art and therefore not described herein. In step 1234, the floppy disk drive 26 is disabled by sending 12 pulses on the MOTENB signal line 416 to the floppy drive access board 20 of the present invention via the floppy drive hardware control register at address 03f2h in the PC 10 by toggling the MOTENB 416 bit in the floppy drive hardware control register.

In step 1236, the key data from the last authorized electronic key 14 is recorded for use in creating the audit trail of the system utilities. In step 1238, the memory resident security program reads the data from the key 14 on the parallel printer port 50. In step 1240, a determination is made as to whether the data read from the electronic key 14 is that of an authorized key 14. If the key 14 not an authorized key 14 or if no key data was read from the parallel printer port 50, execution proceeds to step 1242. In step 1242, if an unauthorized key 14 was detected on the parallel printer port 50, the data read from the unauthorized key 14 and the system time will be recorded as an "unauthorized access attempt" for use in creating the audit trail of the system utilities. If in step 1240, no electronic key data was read from the parallel printer port 50, no data is recorded. Execution then returns to step 1238.

If in step 1240 an authorized key 14 was detected on the parallel printer port 50, execution proceeds to step 1244 where the key 14 data and the system time are recorded as an "authorized access." Execution then proceeds to step 1246, where the floppy disk drive 26 is enabled by sending 6 pulses on the MOTENB signal on line 416 to the floppy drive access board 20 of the present invention. This is accomplished in the same manner as previously described in step 1234. Execution then proceeds to step 1248, where the video monitor 60 screen is restored. In step 1250, the miscellaneous hardware interrupts are enabled by restoring the original IRQ mask byte to the interrupt controller in the PC 10. This technique is well known to those experienced in the art and will not be further described. Execution then proceeds to step 1252.

In step 1252, the mouse 36 is enabled. Next, the keyboard 35 is enabled by calling interrupt 2fh, with the ax register equal to EE01h and the dl register equal to 0. In step 1254 the memory resident security program terminates and exits to the operating system.

Figure 13A:
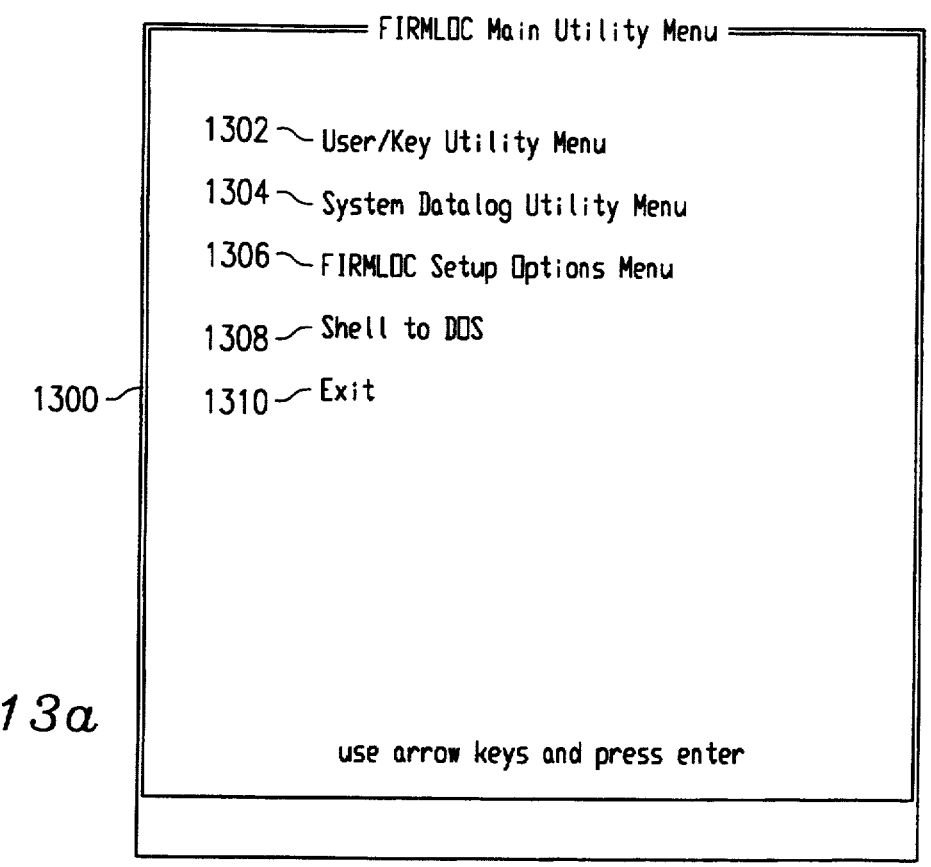

FIGS. 13a through 13f comprise representative of the menu screens of the system utilities which may be accessed with the system administrator key 14. FIG. 13a shows the Main Utility Menu, designated by reference numeral 1300. This screen offers the system administrator five options, which are view the User/Key Utility Menu 1302; view the System Datalog Utility Menu 1304; view the FIRMLOC Setup Options Menu 1306; utilize the Shell to DOS function 1308; or exit the system utilities 1310.

Figure 13B:
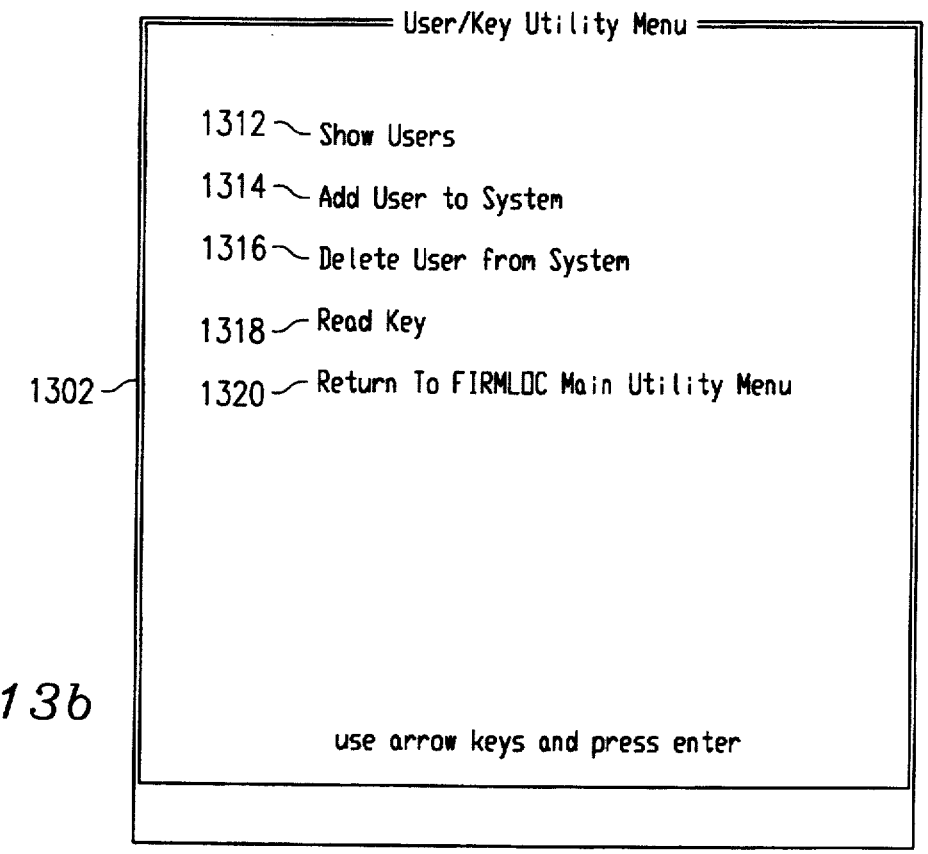

FIG. 13b shows the User/Key Utility Menu 1302. The system administrator is offered the selection of five options. Show Users 1312 enables the system administrator to view a listing of either all system users (authorized and unauthorized), or only authorized system users. Add User to System 1314 or Delete User from System 1316 enables the system administrator to add or delete user keys from the system, thereby controlling the designation of identity of the users who are authorized to access the computer system. Read Key 1318 enables the system administrator to read the data from any electronic key 14 inserted into the jack 16 and to display the name of the user and the number of the electronic key 14 on the video monitor 60. Return to FIRMLOC Main Utility Menu 1320 returns the system administrator to the Main Utility Menu 1300.

Figures 13C, 13D:
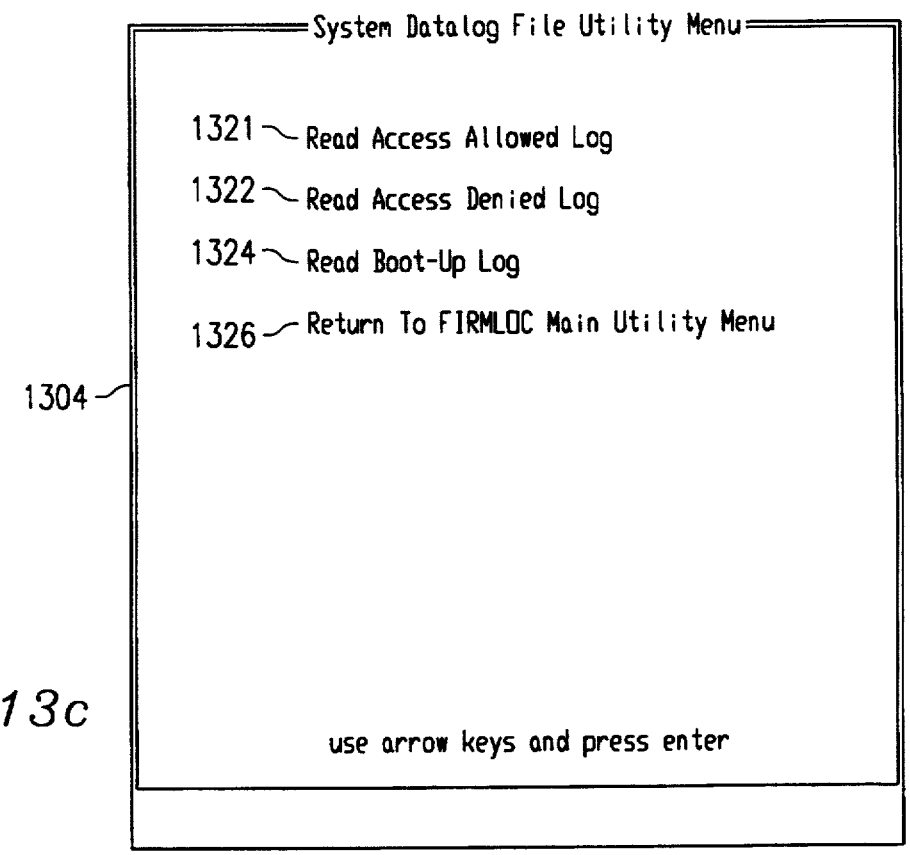

FIG. 13c illustrates the System Datalog File Utility Menu 1304, which gives the system administrator four options. The first, Read Access Allowed Log 1321, enables the system administrator to determine what users have been logged on the computer system and at what time(s). The system administrator has the option of outputting the user data to the video monitor 60 screen or to a file, and also has the option of performing a sort by user or by date. FIG. 13d illustrates a User Access Datalog Window as output to screen and sorted by user.

Referring again to FIG. 13c, another option available to the system administrator is Read Access Denied Log 1322. The "User Access Denied" file lists the users who were denied access to the computer system and the date and time at which they attempted access. FIG. 13e illustrates a User Access Denied Datalog Window.

Referring again to FIG. 13c, Read Boot-Up Log 1324 enables the system administrator to determine the dates and times the PC 10 has been booted up. The final option 1326 returns the system administrator to the Main Utility Menu 1300.

FIG. 13f illustrates the FIRMLOC Setup Options Menu 1306. User Display Options 1330 enables the system administrator to change the screen saver automatically displayed by the present invention on boot-up of the PC 10 by selecting either a blank screen or two lines of custom text. Hardware IRQ Options 1332 enables the system administrator to select specific hardware interrupts which will be disabled prior to insertion and upon removal of an authorized electronic key 14. This allows the system administrator to disable other I/O devices which might be connected to the PC 10, such as serial communication ports. Exercising the IRQ Options 1332 generates the IRQ mask byte, which was discussed with reference to FIG. 11.

Referring to FIGS. 1-13, operation of one embodiment of the present invention is now described. The hardware and software of the security system of the present invention is easily installed by a computer user. The jack 16 is installed by first removing the printer cable 44 from the parallel printer port 50. The adapter 18 is designed such that it has a plug side and a socket side. The plug side of the adapter 18 is inserted into the parallel printer port 50 and secured, and the printer cable 44 is plugged into the socket side of the adapter 18. The jack 16 is connected to the adapter 18 by line 62 and may then be affixed to any convenient spot on the computer cabinet with adhesive backing.

The software of the present invention is installed on the hard disk drive 30 by inserting a diskette containing control logic for the present invention into the floppy disk drive 26. The user enters "A:INSTALL" on the keyboard 35, and follows the instructions displayed on the video monitor 60 screen. During the installation procedure, the user creates a unique identification for 2 administrator keys, and these identifications are stored in the system memory 31. Once installed, the administrator keys can be used to add or delete up to ninety-eight user keys by accessing the utilities menu options.

The floppy disk access board 20 is installed by first removing the cover from the cabinet of the PC 10 and connecting a spare power cable (not shown) from the computer power supply to the floppy disk access board 20. Next, the floppy disk drive cable 27 is removed from the back of the floppy disk drive 26 and pressed onto the floppy disk access board 20 at connector 20a. Finally, the floppy disk access board 20 at connector 20b is gently pressed into the floppy disk drive 26 at connector 20a. In PCs which have both an A drive and a B drive, the floppy disk access board 20 is generally installed on the A drive; however, the board 20 may be installed on the B drive, should space limitations prevent installation on the A drive. When installed in the above manner, the floppy disk access board 20 will defeat any unauthorized attempt to install an artificial operating system from the floppy disk drive 26.

With respect to laptop and notebook type computers, because of internal space limitations which prevent installation of the floppy disk access board 20 directly behind the floppy disk drive 26, the floppy disk access board 20 may be incorporated directly into the floppy disk drive cable 27, allowing the board 20 to be placed as dictated by available space inside the computer, or may be incorporated directly into the PC 10 motherboard circuitry.

After the present invention is installed on the PC 10, it will be necessary for a user to insert an electronic key 14 into the jack 16 to access the system. A total of one hundred keys may be programmed to access the system. Each electronic key 14 contains a unique identification code which allows the system to identify a particular user, to determine whether that user is authorized to access the system, and to record successful and unsuccessful attempts to access the system.

During a cold boot-up of the PC 10, the floppy disk access board 20 disables the floppy disk drive 26, forcing the PC 10 to boot-up from the hard disk drive 30 and to install the control logic of the security system of the present invention. Boot-up time is recorded in the appropriate file of the system utilities. During the initialization routine of the PC 10, the LOCK-IT.SYS device driver program, the FIRMLOC.EXE program and the BLOCK-IT.EXE program are executed, as previously described in detail with reference to FIG. 2. The keyboard 35, the mouse 36, and those devices which have been selected by the system administrator through use of the Hardware IRQ Options 1332, described in detail with reference to FIG. 13f, remain disabled until an electronic key 14 is inserted into the jack 16. It is understood that only one key 14 inserted into the jack 16 at any one time is functional.

Once an electronic key 14 is inserted into the jack 16, the FIRMLOC.EXE program, described in detail with reference to FIGS. 9a and 9b, determines first whether or not the electronic key 14 is authorized to access the PC 10, and if so, whether or not the electronic key 14 is a system administrator key. If no electronic key 14 is inserted or if the electronic key 14 which is inserted is not authorized to access the PC 10, the PC 10 remains disabled and the time and date of the access attempt is recorded in the "User Access Denied" file, as shown in FIG. 13e.

If the electronic key 14 is authorized, the name of the user, and the date and time of access are recorded in the appropriate utility file, as shown in FIG. 13d. Six pulses, initiated by the memory resident security program, are sent to the floppy disk access board 20 to enable the board 20 and thus the floppy disk drive 26, as described in detail with reference to FIG. 6b. Assuming the electronic key 14 is a system administrator key 14, the system administrator is permitted to access the system utilities and, using the system utility menus shown if FIGS. 13a–f, add and delete user keys, monitor system access and use, and select which devices are to be disabled if access is not authorized. Once the system administrator exits the utilities, execution proceeds to DOS. As previously discussed, normal user keys 14 only access the computer system and not the system utilities.

A memory resident security program, described with reference to FIG. 10 and 12, continuously monitors the parallel printer port 50 at half second intervals throughout system use. If at any time during use, the authorized electronic key 14 is removed, twelve pulses are sent by the memory resident security program to the floppy disk access board 20 to disable the board 20 and the floppy disk drive 26. The keyboard 35, the mouse 36, and those devices which have been selected by the system administrator through use of the Hardware IRQ Options 1332 are disabled, the video monitor 60 screen is blanked, and the PC 10 operation remains suspended until an authorized electronic key 14 is inserted. Once the security system recognizes an authorized electronic key 14, PC 10 operation resumes from the point at which it was previously suspended. This feature is referred to as "auto-suspend." The key 14 may be removed and reinserted successively in order to suspend operation without loss of data and without requiring rebooting of the PC 10. For example, the key 14, may be removed to temporarily blank the screen or prevent keyboard 35 use while the user leaves the PC 10 for a period of time, allowing the user to continue use from the same point upon return.

So long as an authorized electronic key 14 is detected at the parallel printer port 50, the security system 12 of the present invention is undetectable by the user and by user application programs executing on the system. Operation proceeds as usual until the user is finished using the PC 10.

It is understood that the present invention can take many forms and embodiments. The embodiments shown herein are intended to illustrate rather than to limit the invention, it being appreciated that variations may be made without departing from the spirit of the scope of the invention. For example, the PC 10 may be a non-IBM compatible computer, a laptop or notebook computer, or any other computer configuration. Further, the security system 12 is not limited to DOS-based software operating systems and may be adapted to other computer software operating systems.

The system may be used to selectively disable different components of the PC, while allowing for operation of other components. Furthermore, alternative I/O devices on the PC 10, such as other parallel printer ports 50 or serial communication ports (not shown), may be used to implement the security system 12 of the present invention. It is understood that the electronic key 14 interface may be connected to the microprocessor 22 directly or may be connected indirectly through I/O ports or the internal data bus of the PC 10.

In addition, the floppy disk access board 20 may be incorporated directly into the floppy disk drive 26, or incorporated into the floppy disk drive cable 27 between the floppy disk drive 26 and the floppy disk drive controller 24. The floppy disk access board 20 may also be incorporated directly Onto the motherboard circuitry of the PC 10. The concept of the floppy disk access board 20 may be implemented for use in controlling data access to other mass data storage devices which are used in computers, such as hard disk drives.

The present invention can also be implemented on computer systems which do not have hard disk drives and can be incorporated into the non-volatile boot-up ROM BIOS memory chips, allowing the security system 12 to selectively control the access to data on the hard disk drive 30.

It is also understood that the electronic key 14 of the present invention is not the only type of technology which may be used to identify authorized computer users. The identification device used in the present invention need not be removable. For example, authorized users may be identified through the use of devices such as electronic keypads, magnetic cards, physical keys, or even fingerprint and retinascanners.

Although illustrative embodiments of the invention have been shown and described, a wide range of modification, change and substitution is intended in the foregoing disclosure and in some instances some features of the present invention may be employed without a corresponding use of other features. Accordingly, it is appropriate that the appended claims be construed broadly and in the manner consistent with the scope of the invention.

What is claimed is:

1. A method for controlling user access to a computer having a processor, a system timer, a system memory, and at least one input/output (I/O) device connected to said processor, said processor being directed by interrupts for execution of interrupt services and said computer further including a key device connectable to said processor for removably coupling data to said processor indicating a user identification, said method comprising the steps of:

storing in said system memory a data file of at least one authorized user identification;
   capturing a system timer interrupt;
   connecting said key device to said processor;
   responsive to said system timer interrupt, periodically reading said user identification from said key device and comparing said read user identification with said stored authorized user identification; and
   disabling said at least one I/O device when said read user identification fails to match said stored authorized user identification.

2. The method of claim 1 wherein said user identification fails to match said stored authorized user identification when said key device is disconnected from said processor.

3. The method of claim 1 further comprising the computer-implemented step of:
   storing said user identification in an audit trail data file of said system memory when said user identification fails to match said stored authorized user identification and said user identification data is coupled to said processor.

4. The method of claim 1 further comprising the computer-implemented step of storing said user identification in an audit trail data file of said system memory when said user identification matches said stored authorized user identification.

5. The method of claim 3 or 4 further comprising the computer-implemented step of storing in said audit trail data file the date and time of said coupling of said user identification data.

6. The method of claim 1 further comprising the computer-implemented steps of:
   following said disabling of said at least one device and responsive to subsequent system timer interrupts, periodically reading said user identification from said key device and comparing said read user identification with said stored authorized user identification; and
   enabling said at least one I/O device when said read user identification matches said stored authorized user identification.

7. The method of claim 1 wherein said step of reading occurs once for each period of nine system timer interrupts.

8. The method of claim 1 wherein said at least one I/O device comprises a keyboard, said method further comprising the computer-implemented steps of:
   capturing a keyboard interrupt; and
   responsive to said interrupt, immediately returning execution of said processor.

9. The method of claim 1 wherein said at least one I/O device comprises a floppy disk drive.

10. The method of claim 1 wherein said at least one I/O device comprises a monitor.

11. The method of claim 1 wherein said at least one I/O device comprises one or more of a mouse, monitor, keyboard, mass storage device and communications device.

12. The method of claim 1 wherein said at least one authorized user identification comprises up to 100 separate authorized user identifications.

13. The method of claim 1 further comprising the computer-implemented step of storing an authorized user identification in said system memory corresponding to said removably coupled data of a user identification.

14. The method of claim 1 wherein said system memory includes an interrupt vector table for storing interrupt request address entries used in directing said processor execution of interrupt services, said step of capturing a system timer interrupt further comprising the computer-implemented step of replacing the interrupt timer request address entry stored in said interrupt vector table with a new address entry corresponding to an interrupt service for performing said reading, comparing and disabling steps.

15. A method for controlling user access to a computer having a processor, a system memory, a mass storage device and a disk operating system for controlling execution of said processor, said disk operating system being loaded from said mass storage device to said system memory in an initialization procedure executed in said processor that includes execution of a system start-up batch file for loading terminate and stay resident utilities into said system memory, said computer further including a key device connectable to said processor for removably coupling data to said processor indicating a user identification, said method comprising the steps of:

storing in said system memory a data file of at least one authorized user identification;

connecting said key device to said processor;

reading said user identification data from said key device and comparing said read user identification data with said stored authorized user identification data during execution of said batch file loading procedure;

suspending said execution of said batch file loading procedure when said read user identification data fails to match said stored user identification data, thereby preventing loading of said terminate and stay resident utilities into said system memory; and continuing said execution of said batch file loading procedure when said read user identification data matches said stored authorized user identification data, thereby permitting loading of said terminate and stay resident utilities and completion of said initialization procedure.

16. The method of claim 15 wherein said initialization procedure executed in said processor includes loading of installable device drivers into said system memory and said computer includes a keyboard connected to said processor, said method further comprising the computer-implemented step of capturing a keyboard interrupt during said loading of installable device drivers to disable said keyboard responsive to said interrupt.

17. The method of claim 15 wherein said mass storage device comprises a hard disk drive and said computer further includes a floppy disk drive coupled to said processor, further comprising the computer-implemented step of disabling said floppy disk drive as part of said initialization procedure to prevent circumvention of said disk operating system loading from said hard disk drive.

18. A method for controlling user access to a computer having a processor, a system timer, a system memory, and at least one input/output (I/O) device connected to said processor, said computer further including a key device connected to said processor for removably coupling data to said processor indicating a user identification, said method comprising the steps of:

storing in said system memory a data file of at least one authorized user identification, said at least one authorized user identification including at least one administrator identification;

a user connecting said key device to said processor;

periodically reading said user identification from said key device and comparing said read user identification with said stored authorized user identification;

disabling said at least one device when said read user identification fails to match one of said at least one stored authorized user identification; and selectively entering at least one utility menu option when said read user identification matches said at least one administrator identification.

19. The method of claim 18 wherein said step of entering at least one utility menu option comprises the computer-implemented step of viewing said at least one authorized user identification stored in said memory.

20. The method of claim 18 wherein said step of entering at least one utility menu option comprises the computer-implemented step of adding a new authorized user identification to said data file.

21. The method of claim 18 wherein said step of entering at least one utility menu option comprises the computer-implemented step of deleting an authorized user identification from said data file.

22. The method of claim 18 wherein said step of entering at least one utility menu option comprises the computer-implemented step of displaying a user identification corresponding to said coupled data.

23. The method of claim 18 wherein said step of entering at least one utility menu option comprises the computer-implemented step of storing selected interrupts in an interrupt request mask register of said processor, said interrupts corresponding to I/O devices to be disabled in said disabling step 24. The method of claim 18 further comprising the computer-implemented step of storing an access data file in said system memory of said user identifications read by said processor.

25. The method of claim 18 wherein said step of entering said at least one utility menu option comprises the computer-implemented step of viewing said user identifications stored in said access data file.

26. Apparatus for controlling user access to a computer, said computer having a processor, a system timer, a system memory and at least one input/output device connected to said processor, said processor being directed by interrupts for execution of interrupt services, said apparatus comprising:

an input/output port coupled to said processor;

key means including data terminals for connection to said input/output port for removably coupling data to said processor indicating a user identification;

a data file stored in said system memory indicating at least one authorized user identification;

logic stored in said system memory and executed in said processor for capturing a system timer interrupt;

security logic stored in said system memory and executed in said processor responsive to said system timer interrupt for periodically reading said user identification from said key means and comparing said read user identification with said stored authorized user identification; and said security logic for disabling said at least one I/O device when said read user identification fails to match said stored authorized user identification.

27. The apparatus of claim 26 further comprising logic stored in said system memory and executed in said processor for storing in said system memory an access data file of said user identification and a system time, corresponding to each coupling of data by said key means to said processor.

28. The apparatus of claim 26 wherein said at least one input/output device of said computer includes a mass data storage device for coupling by a device controller to said processor and for transferring data to said system memory, said apparatus further comprising:
   access circuitry connected between said mass data storage device and said controller for selectively disabling said transfer of data from said mass data storage device to said system memory responsive to said security logic.

29. The apparatus of claim 26 wherein said key means comprises:
   at least one electronic key having a memory for storing said user identification, control logic connected to said key memory for reading data from said key memory and for writing data to said key memory, and an a connector including control lines coupled to said control logic and a data input/output coupled to said memory;
   a jack for removably receiving said connector; and
   a cable connecting said jack to said processor.

30. The apparatus of claim 29 wherein said computer includes an input/output port connected to said processor and said cable connects said jack to said port.

31. The apparatus of claimed 29 wherein said input/output port comprises a parallel printer port.

32. The apparatus of claim 26 wherein said at least one input/output device comprises a keyboard.

33. The apparatus of claim 26 wherein said at least one input/output device comprises a monitor.

34. The apparatus of claim 26 wherein said at least one input/output device comprises a mouse.

35. The apparatus of claim 26 wherein said at least one input/output device comprises a modem.

36. Apparatus for controlling user access to said computer having a processor, at least one input/output (I/O) port connected to said processor, a system timer, a system memory, a mass storage device coupled by a device controller to said processor for transferring data to said system memory and at least one I/O device connected to said processor, said processor being directed by interrupts for execution of interrupt services, said apparatus comprising:
   A key device for removably coupling data to said processor indicating a user identification, said key device including at least one electronic key having means for providing said user identification data and a connector coupled to said data means, a jack for removably receiving said connector, and a cable connecting said jack to said processor through said I/O port;
   a data file stored in said system memory indicating at least one authorized user identification;
   logic stored in said system memory and executed in said processor for capturing a system timer interrupt;
   security logic stored in said system memory and executed in said processor responsive to said system timer interrupt for periodically reading said user identification from said key means and comparing said read user identification with Said. stored authorized user identification;
   said security logic for disabling said at least one I/O device when said read user identification fails to match said stored authorized user identification; and
   access circuitry connected between said mass data storage device and said controller for selectively disabling said transfer of data from said mass data storage device to said system memory responsive to said security logic.

37. The apparatus of claim 36 further comprising logic stored in said system memory and executed in said processor for storing in said system memory an access data file of said user identification and a system time, corresponding to each coupling of data by said key device to said processor.

38. The apparatus of claim 36 wherein said input/output port comprises a parallel printer port.

39. The apparatus of claim 36 wherein said at least one input/output device comprises a keyboard.

40. The apparatus of claim 36 wherein said at least one input/output device comprises a monitor.

* * * * *

UNITED STATES PATENT AND TRADEMARK OFFICE
CERTIFICATE OF CORRECTION

PATENT NO. : 5,377,269
DATED : December 27, 1994
INVENTOR(S) : John P. Heptig et al.

It is certified that error appears in the above-indentified patent and that said Letters Patent is hereby corrected as shown below:

Column 9, line 5, "40" should be --410--.

Column 10, line 8, "=receives" should be --receives--.

Column 12, line 61, "BLOCK_IT_EI" should be --BLOCK-IT.EXE--

Column 13, line 47, "10ad access" should be --load access--.

Column 17, line 65, "attemptsto" should be --attempts to--.

Signed and Sealed this

Fourteenth Day of March, 1995

Attest:

BRUCE LEHMAN

Attesting Officer      Commissioner of Patents and Trademarks